(12) United States Patent
Noguchi

(10) Patent No.: US 12,511,998 B2
(45) Date of Patent: Dec. 30, 2025

(54) LOCATION INFORMATION OUTPUT METHOD, LOCATION INFORMATION OUTPUT SYSTEM, AND PROGRAM

(71) Applicant: HONDA MOTOR CO., LTD., Tokyo (JP)

(72) Inventor: Kohei Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 18/284,084

(22) PCT Filed: Mar. 31, 2021

(86) PCT No.: PCT/JP2021/013924
§ 371 (c)(1),
(2) Date: Sep. 26, 2023

(87) PCT Pub. No.: WO2022/208769
PCT Pub. Date: Oct. 6, 2022

(65) Prior Publication Data
US 2024/0177604 A1    May 30, 2024

(51) Int. Cl.
*G08G 1/13* (2006.01)
*G07C 5/00* (2006.01)
*H04W 4/029* (2018.01)

(52) U.S. Cl.
CPC .............. *G08G 1/13* (2013.01); *G07C 5/008* (2013.01); *H04W 4/029* (2018.02)

(58) Field of Classification Search
CPC ...... G08G 1/13; G08G 1/0141; G08G 1/0112; G08G 1/0133; G08G 1/0969; G07C 5/008;
(Continued)

(56) References Cited

U.S. PATENT DOCUMENTS

| 2012/0054054 A1 | 3/2012 | Kameyama |
| 2012/0130777 A1* | 5/2012 | Kaufman ............... G07B 15/02 705/13 |

(Continued)

FOREIGN PATENT DOCUMENTS

| JP | 2006-011814 | 1/2006 |
| JP | 2008-128659 | 6/2008 |

(Continued)

OTHER PUBLICATIONS

International Search Report and Written Opinion for International Application No. PCT/JP2021/013924 mailed on Jun. 22, 2021, 9 pages.

(Continued)

*Primary Examiner* — James J Yang
(74) *Attorney, Agent, or Firm* — Amin, Turocy & Watson, LLP

(57) ABSTRACT

A location information output method includes acquiring location information from a moving body via a network, the location information indicating a location measured by a location measuring device mounted on the moving body which includes at least one of a vehicle and a terminal device owned by an occupant of the vehicle, determining an operating state of the vehicle on the basis of the information received from the moving body via the network, and in a case a transition of the operating state of the vehicle satisfies a predetermined condition, outputting information indicating that the moving body is present at a location indicated by the location information from an output part on the basis of the location information in which the location information, which corresponds to a predetermined area including a spot at a time when the operating state of the vehicle has become OFF, is excluded.

9 Claims, 16 Drawing Sheets

(58) Field of Classification Search
CPC ....... H04W 4/029; H04W 4/40; H04W 12/02; G16Y 10/40
See application file for complete search history.

(56) References Cited

U.S. PATENT DOCUMENTS

| | | |
|---|---|---|
| 2013/0282738 A1 | 10/2013 | Kameyama |
| 2015/0348413 A1 | 12/2015 | Han et al. |
| 2016/0029212 A1 | 1/2016 | Brandt et al. |
| 2016/0330615 A1 | 11/2016 | Hania et al. |

FOREIGN PATENT DOCUMENTS

| | | | | |
|---|---|---|---|---|
| JP | 2011-221665 | | 11/2011 | |
| JP | 2012-053593 | | 3/2012 | |
| JP | 2012053593 A | * | 3/2012 | ......... G01C 21/3608 |
| JP | 2012-168796 | | 9/2012 | |
| JP | 2015-132968 | | 7/2015 | |
| JP | 2015132968 A | * | 7/2015 | |
| JP | 2015-149079 | | 8/2015 | |
| JP | 2016-051384 | | 4/2016 | |
| JP | 2016-071759 | | 5/2016 | |
| JP | 2016071759 A | * | 5/2016 | |
| JP | 2017-503283 | | 1/2017 | |

OTHER PUBLICATIONS

European Search Report for European Patent Application No. 21934935.4 mailed Apr. 4, 2024.
Japanese Office Action for Japanese Patent Application No. 2023-510058 mailed Jun. 4, 2024.

\* cited by examiner

1

LOCATION INFORMATION OUTPUT METHOD, LOCATION INFORMATION OUTPUT SYSTEM, AND PROGRAM

TECHNICAL FIELD

The present invention relates to a location information output method, a location information output system, and a program.

BACKGROUND ART

In recent years, a system that uses moving information of a moving body to transmit congestion information or to transmit advertisements has become known.

However, an individual may be identified if a location of the moving body is continuously notified. Here, a technology that notifies the location of a moving body without identifying an individual is attracting attention.

For example, a technology that hides points set by the user in advance, such as the user's house or the like, when notifying the manager of the user's location information is known (see Patent Document 1). However, the work of setting by a user is required, and there is a burden on the user.

In addition, among the user's moving routes, there is one that ensures the confidentiality of the location of the user's house or the like by not notifying the manager of a starting point and an arrival point that are likely to correspond to the user's house or the like (see Patent Document 2). However, since detailed map information (whether or not a point is being used by an unspecified number of people with a large traffic volume, etc.) is required, the quantity of information required for control may increase.

CITATION LIST

Patent Document

[Patent Document 1]
Japanese Unexamined Patent Application, First Publication No. 2015-132968

SUMMARY OF INVENTION

Technical Problem

In the related art, in order to ensure anonymity of a user's location, both user-side burden reduction and manager-side burden reduction have not been sufficiently considered.

In consideration of the above-mentioned circumstances, the present invention is directed to providing a location information output method, a location information output system, and a program that are capable of securing anonymity of a current location of a moving body and reducing a burden thereof.

Solution to Problem (1) A location information output method of causing a computer to: acquire location information from a moving body via a network, the location information indicating a location measured by a location measuring device (113, 260) mounted on the moving body which includes at least one of a vehicle (100) and a terminal device (200) owned by an occupant of the vehicle; determine an operating state of the vehicle on the basis of the information received from the moving body via the network; and, in a case a transition of the operating state of the vehicle satisfies a predetermined condition, output information indicating that the moving body is present at a location indicated by the location information from an output part (330) on the basis of location information in which location information, which corresponds to a predetermined area including a spot at a time when the operating state of the vehicle has become OFF, is excluded.

(2) In the above-mentioned (1), in a case the operating state of the vehicle has become OFF, the computer may measure an elapsed time from a time point when the operating state of the vehicle has become OFF, and in a case the elapsed time from the time point when the operating state of the vehicle has become OFF becomes equal to or greater than a set time (T), outputs information indicating that the moving body is present at a location indicated by the location information from the output part on the basis of the location information in which the location information, which corresponds to the predetermined area including the spot at the time when the operating state of the vehicle has become OFF, is excluded.

(3) In the above-mentioned (2), the computer may acquire a time period in which the operating state of the vehicle is in an OFF state, and change the set time according to the acquired time period in which the operating state of the vehicle is in the OFF state.

(4) In the above-mentioned (3), in a case the time period in which the operating state of the vehicle is in the OFF state is a predetermined late night time period and in a case the elapsed time from the time point when the operating state of the vehicle has become OFF is equal to or greater than a first duration smaller than a reference value, the computer outputs information indicating that the moving body is present at the location indicated by the location information from the output part on the basis of the location information in which the location information, which corresponds to the predetermined area including the spot at the time when the operating state of the vehicle has become OFF, is excluded, and in a case the time period in which the operating state of the vehicle is in the OFF state is a predetermined daytime period and in a case the elapsed time from the time point when the operating state of the vehicle has become OFF is equal to or greater than a second duration greater than a reference value, the computer outputs information indicating that the moving body is present at a location indicated by the location information from the output part on the basis of the location information in which the location information, which corresponds to the predetermined area including the spot at the time when the operating state of the vehicle has become OFF, is excluded.

(5) In any one of the above-mentioned (1) to (4), the computer communicates with other vehicles present in a predetermined surrounding area of the vehicle, the computer calculates a number of the other vehicles present in the predetermined surrounding area, and in a case the elapsed time from the time point when the operating state of the vehicle has become OFF is equal to or greater than a set time and in a case the number of the other vehicles present in the predetermined surrounding area is less than a threshold, the computer outputs information indicating that the moving body is present at a location indicated by the location information from the output part on the basis of the location information in which the location information, which corresponds to the predetermined area including the spot at the time when the operating state of the vehicle has become OFF, is excluded.

(6) In any one of the above-mentioned (1) to (5), in a case the operating state of the vehicle has become OFF, the computer measures an elapsed time from a time point when the operating state of the vehicle has become OFF, in a case the elapsed time from the time point when the operating state of the vehicle has become OFF is equal to or greater than a first set time (T), the computer outputs information indicating that the moving body is present at a location indicated by the location information from the output part (330) on the basis of the location information in which the location information, which corresponds to the predetermined area including the spot at the time when the operating state of the vehicle has become OFF, is excluded, and in a case the elapsed time from the time point when the operating state of the vehicle has become OFF is equal to or greater than a second set time (LongT) which is longer than the first set time, the computer deletes the location information, which corresponds to the predetermined area including the spot at the time when the operating state of the vehicle has become OFF, from a database in which the location information received from the moving body is stored.

(7) In the above-mentioned (6), in a case the elapsed time from the time point when the operating state of the vehicle has become OFF is less than the second set time (LongT) and equal to or greater than the first set time (T) and in a case the operating state of the vehicle is in a non-operating state, the computer does not delete the location information, which corresponds to the predetermined area including the spot at the time when the operating state of the vehicle has become OFF, from the database in which the location information received from the moving body is stored.

(8) A location information output system (1) including a moving body including at least one of a vehicle (100) and a terminal device (200) owned by an occupant of the vehicle, and an information management server (300) configured to communicate with the moving body via a network, wherein the moving body includes a communication part (111, 210) configured to transmit location information, which is information indicating a location of the moving body and which indicates a location measured by a location measuring device (113, 260) mounted on the moving body, to the information management server via the network, and the information management server includes: an operating state determination part configured to determine an operating state of the vehicle on the basis of the information received from the moving body via the network; and an output controller (353) configured to output information indicating that the moving body is present at a location indicated by the location information from an output part (330) on the basis of the location information in which location information, which corresponds to a predetermined area including a spot at a time when the operating state of the vehicle has become OFF, is excluded in a case a transition of the operating state of the vehicle satisfies a predetermined condition.

(9) A program configured to cause a computer to: acquire location information from a moving body via a network, the location information being information indicating a location of the moving body and indicating a location measured by a location measuring device (113, 260) mounted on the moving body which includes at least one of a vehicle (100) and a terminal device (200) owned by an occupant of the vehicle, determine an operating state of the vehicle on the basis of the information received from the moving body via the network, and in a case a transition of the operating state of the vehicle satisfies a predetermined condition, output information indicating that the moving body is present at a location indicated by the location information from an output part (330) on the basis of the location information in which location information, which corresponds to a predetermined area including a spot at a time when the operating state of the vehicle has become OFF, is excluded.

Advantageous Effects of Invention

According to the above-mentioned (1) to (9), the anonymity of the current location of the moving body can be secured and the burden can be reduced.

DESCRIPTION OF EMBODIMENTS

Hereinafter, embodiments of a location information output method, a location information output system, and a program of the present invention will be described with reference to the accompanying drawings.

First Embodiment

[Entire Configuration]

Figure 1:
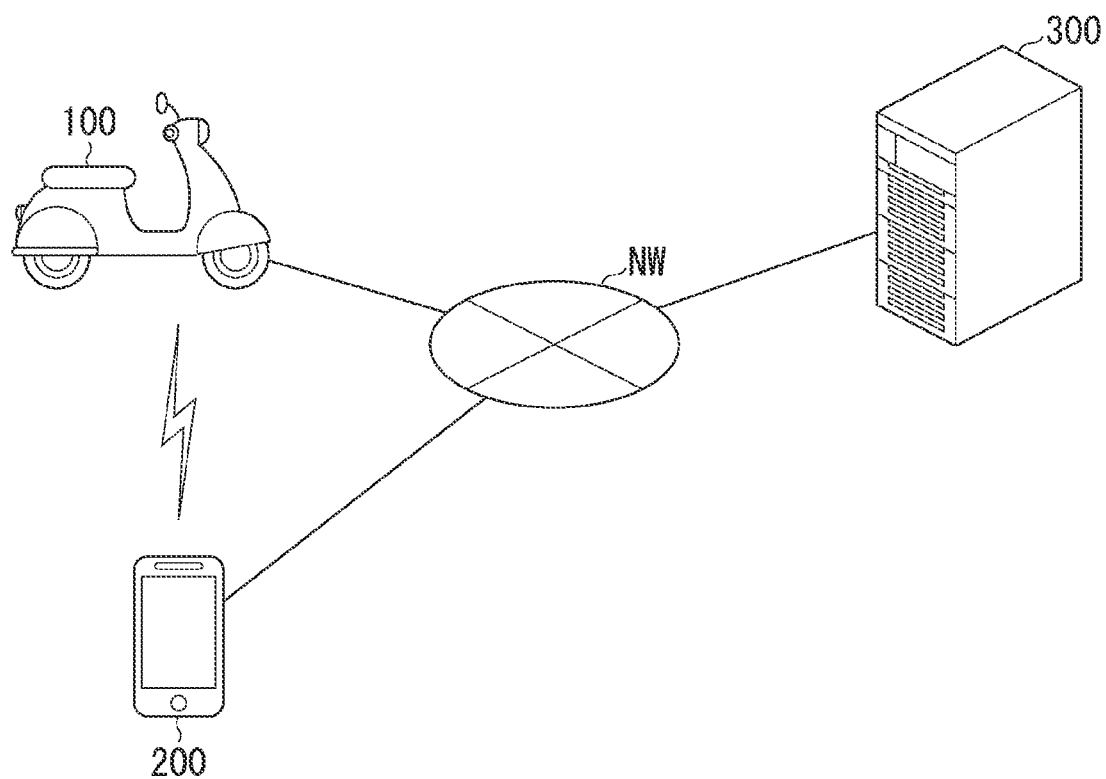
FIG. 1 is a schematic diagram of a location information output system 1 according to an embodiment.

FIG. 1 is a schematic diagram of a location information output system 1 according to an embodiment. The location information output system 1 includes, for example, a motorcycle 100, a user terminal device 200, and an information management server 300. The motorcycle 100, the user terminal device 200, and the information management server 300 are connected via a network NW. Further, the network NW includes, for example, the Internet, a wide area network (WAN), a provider device, a radio base station, or the like. Further, the motorcycle 100 and the user terminal device 200 can be connected using near field communication.

The motorcycle 100 is, for example, a unit swing type scooter type motorcycle. The user terminal device 200 is a communication terminal owned by an occupant in the motorcycle 100, and for example, a cellular phone such as a smartphone or the like, or a portable terminal device having at least a communication function and a display function, such as a tablet terminal, a personal digital assistant (PDA), or the like. The motorcycle 100 and the user terminal device 200 are examples of the moving body.

The information management server 300 manages information received from the motorcycle 100 or the user terminal device 200 and notifies a manager of the information received from the motorcycle 100 or the user terminal device 200. In the embodiment, while an example in which the information management server 300 notifies the manager of the information acquired by the motorcycle 100 will be described, there is no limitation thereto. For example, the information management server 300 may notify the manager of the information acquired by the user terminal device 200, transmit the information acquired by the motorcycle 100 through short-distance wireless communication and notify the manager of the information received from the motorcycle 100 by the user terminal device 200.

<Motorcycle>

Figure 2:
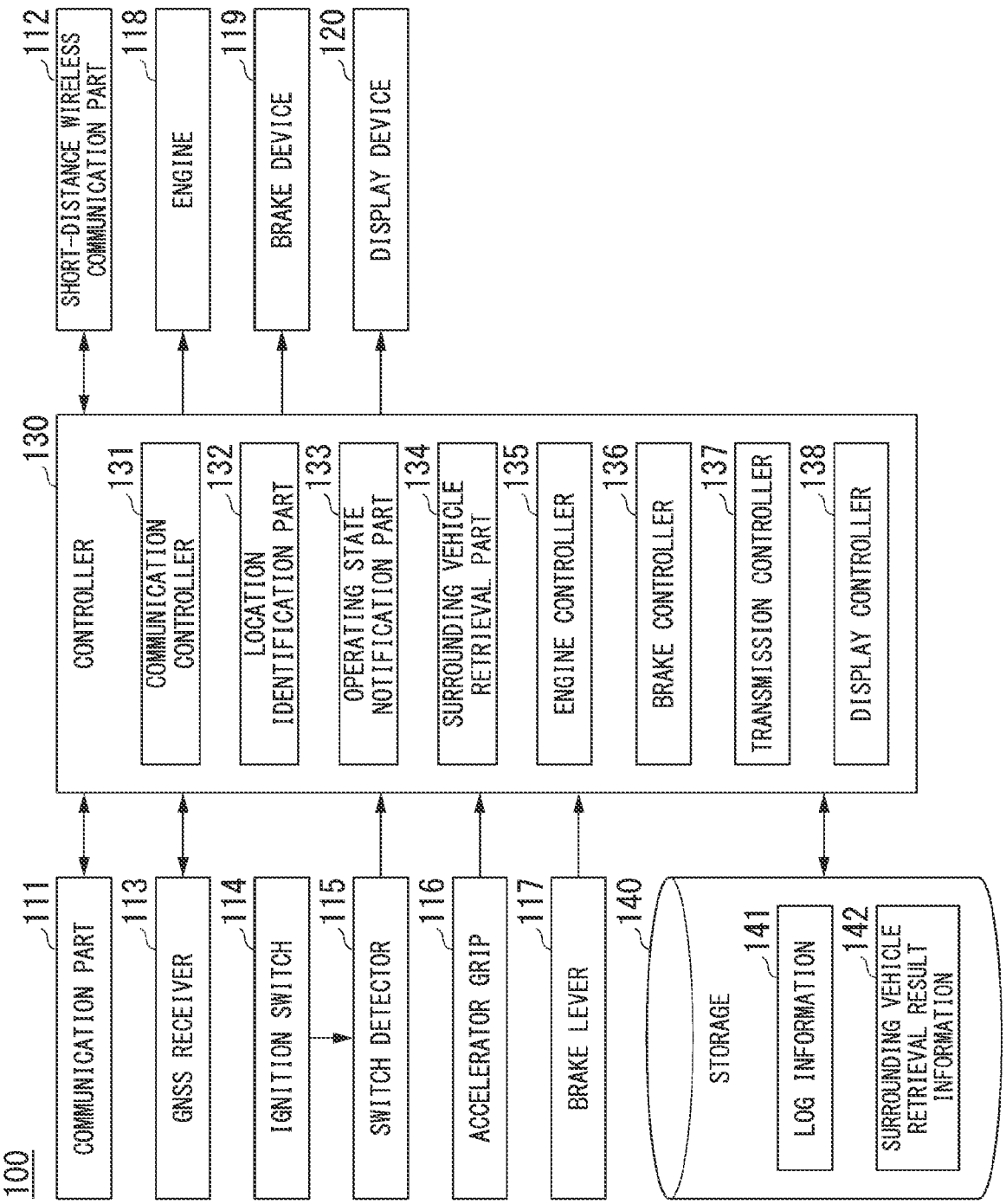
FIG. 2 is a functional block diagram of a motorcycle 100.

FIG. 2 is a functional block diagram of the motorcycle 100. The motorcycle 100 includes, for example, a communication part 111, a short-distance wireless communication part 112, a GNSS receiver 113, an ignition switch 114, a switch detector 115, an accelerator grip 116, a brake lever 117, an engine 118, a brake device 119, a display device 120, a controller 130, and a storage 140.

The communication part 111 includes, for example, a communication interface such as an NIC or the like. The communication part 111 performs communication with the information management server 300 via a communication network such as the Internet under control by the controller 130. The short-distance wireless communication part 112 is a wireless module used for Bluetooth (registered mark) or the like with the user terminal device 200, and has an antenna, a transceiver, and the like.

The GNSS receiver 113 receives a signal from a global navigation satellite system (GNSS) satellite. The ignition switch 114 is a switch configured to receive a startup instruction and a stopping instruction of the engine 118. The switch detector 115 detects that the ignition switch 114 is turned on or the ignition switch 114 is turned off. The switch detector 115 outputs a detection result to the controller 130.

The accelerator grip 116 is attached to a sensor configured to detect an operation quantity or presence or absence of an operation, and receives an acceleration instruction. The brake lever 117 is attached to a sensor configured to detect an operation quantity or presence or absence of an operation, and receives an instruction of deceleration or stopping.

The engine 118 outputs a traveling driving force (torque) for traveling the motorcycle 100 to a driving wheel. The engine 118 includes, for example, an internal combustion engine, an electric motor, a gearbox, and the like. The brake device 119 includes, for example, a brake caliper, a cylinder configured to transmit a hydraulic pressure to the brake caliper, and an electric motor configured to generate a hydraulic pressure in the cylinder. The display device 120 includes, for example, a liquid crystal display (LCD), an organic electroluminescence (EL) display, or the like. The display device 120 is installed at a position where the driver can easily see it while driving.

The controller 130 is, for example, an electronic control unit (ECU). The controller 130 is described as one block for the sake of simplicity of description, but it is not limited thereto and may be divided into a plurality of units.

The controller 130 includes, for example, a communication controller 131, a location identification part 132, an operating state notification part 133, a surrounding vehicle retrieval part 134, an engine controller 135, a brake controller 136, a transmission controller 137, and a display controller 138. Some or all of these function units are realized by executing a program (software) stored in a storage using a processor such as a central processing unit (CPU) or the like. In addition, some or all of functions of these components may be realized by hardware (circuit part: including circuitry) such as a large scale integration (LSI), an application specific integrated circuit (ASIC), a field-programmable gate array (FPGA), or the like, or may be realized by cooperation of software and hardware. The program may be stored in a storage device such as a hard disk drive (HDD), a flash memory, or the like, in advance, or may be stored in a detachable medium such as a DVD, a CD-ROM, or the like, and installed by mounting the medium in a drive device.

The communication controller 131 controls the communication part 111 and performs communication with the information management server 300 via the network NW. In addition, the communication controller 131 controls the short-distance wireless communication part 112 and performs communication with the user terminal device 200.

The location identification part 132 identifies a location of the motorcycle 100 on the basis of a signal received by the GNSS receiver 113. The location of the motorcycle 100 is expressed by latitude and longitude. Further, the location identification part 132 generates information in which information indicating measurement date and time (date and time when the location of the motorcycle 100 is identified) is associated with the information indicating the identified location of the motorcycle 100 (hereinafter, referred to as location information).

The operating state notification part 133 generates information indicating date and time when the ignition switch 114 was turned on (hereinafter, referred to as IGON information) when the switch detector 115 determines that the ignition switch 114 is turned on, and outputs the information to the transmission controller 137. In addition, the operating state notification part 133 generates information indicating date and time when the ignition switch 114 was turned off (hereinafter, referred to as IGOFF information) and outputs the information to the transmission controller 137 when the switch detector 115 detects that the ignition switch 114 is turned off.

The surrounding vehicle retrieval part 134 retrieves other vehicle existing within a predetermined communication range around a host vehicle using the short-distance wireless communication part 112. For example, the surrounding vehicle retrieval part 134 retrieves other communicated vehicle as other vehicle existing therearound, generates information indicating the number of other vehicles obtained by retrieval or retrieved date and time (hereinafter, referred to as surrounding vehicle number information), and outputs the information to the transmission controller 137. The surrounding vehicle retrieval part 134 may communicate with other vehicle in the vicinity through vehicle-to-vehicle communication, and may communicate with other vehicle in the vicinity through road-to-vehicle communication. The vehicle-to-vehicle communication is communication of information about the host vehicle between vehicles. The road-to-vehicle communication is the communication of information about the host vehicle between vehicles through a roadside unit installed in a parking lot, etc., which have communication functions.

The engine controller 135 starts up the engine 118 when it is detected that the ignition switch 114 is turned on, and stops the engine 118 when it is detected that the ignition switch 114 is turned off. In addition, the engine controller 135 controls the engine 118 on the basis of the operation contents received via the accelerator grip 116. The brake controller 136 controls the brake device 119 on the basis of the operation contents received via the brake lever 117. Here, while an example in which the engine 118 is mounted will be described, a configuration including a motor may be provided.

The transmission controller 137 continuously transmits location information of the motorcycle 100 generated by the location identification part 132 to the information management server 300 via the network NW using the communication part 111 when the ignition switch 114 of the motorcycle 100 is turned on. In addition, the transmission controller 137 transmits IGON information or IGOFF information generated by the operating state notification part 133 or surrounding vehicle number information generated by the surrounding vehicle retrieval part 134 to the information management server 300 via the network NW using the communication part 111. When the ignition switch 114 is turned off, the transmission controller 137 may stop transmission of the location information or the like. Hereinafter, the information transmitted by the transmission controller 137 may be referred to as vehicle information.

The display controller 138 displays predetermined illustration or character information on the display device 120. For example, the display controller 138 receives the information generated on the basis of the transmitted location information (for example, a congestion map or the like showing traffic conditions) from the information management server 300, and displays the information on the display device 120.

The storage 140 is realized by, for example, a random access memory (RAM), a read only memory (ROM), a hard disk drive (HDD), or the like. The storage 140 stores programs executed by the processor, and also stores log information 141, surrounding vehicle retrieval result information 142, and the like. The log information 141 stores location information in which the location acquired by the location identification part 132 is associated with information indicating measurement date and time. For example, the location identification part 132 periodically acquires location information at each predetermined time (for example, several seconds, several micro seconds), and stores the location information in the log information 141. In the log information 141, the location information may be automatically deleted when a predetermined time has passed. In addition, the log information 141 may include IGON information or IGOFF information generated by the operating state notification part 133. The surrounding vehicle retrieval result information 142 includes, for example, surrounding vehicle number information generated by the surrounding vehicle retrieval part 134.

<User Terminal Device>

Figure 3:
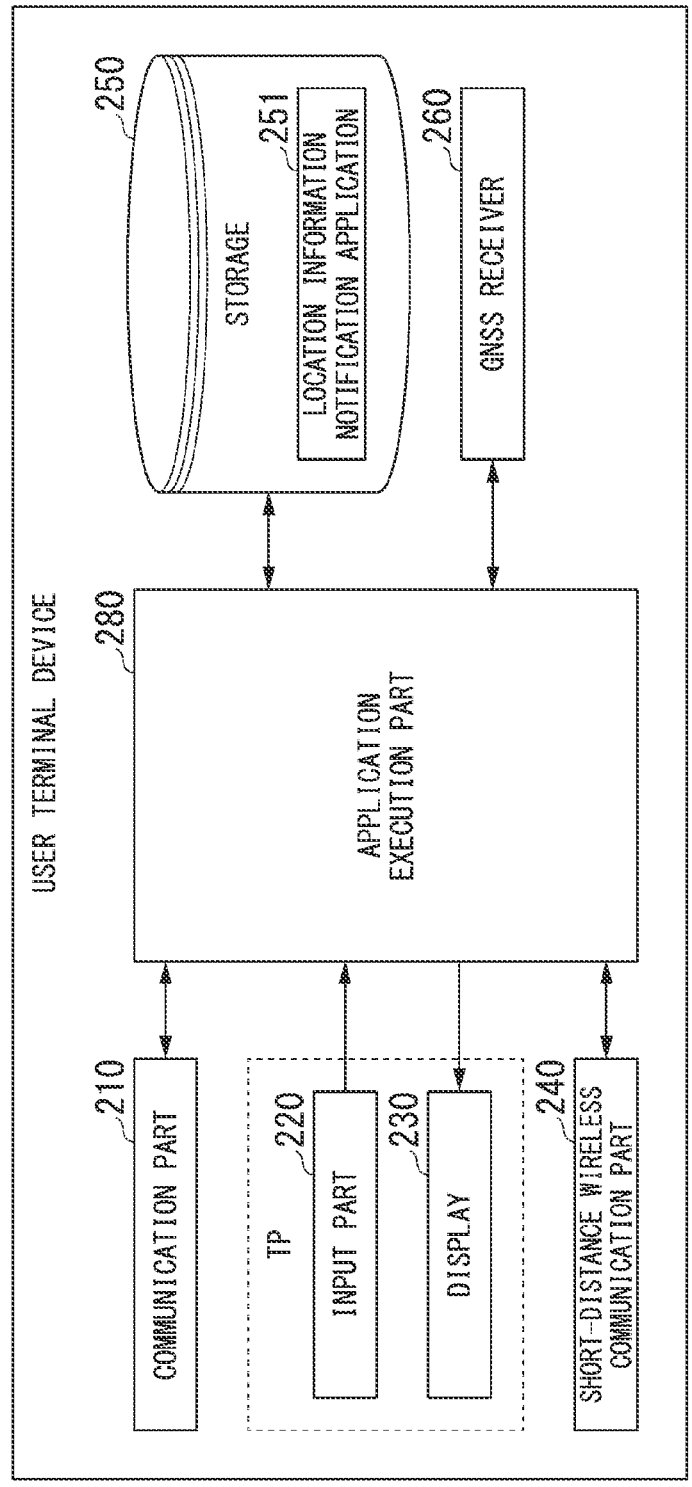
FIG. 3 is a functional block diagram of a user terminal device 200.

FIG. 3 is a functional block diagram of the user terminal device 200. The user terminal device 200 includes, for example, a communication part 210, an input part 220, a display 230, a short-distance wireless communication part 240, a storage 250, a GNSS receiver 260, and an application execution part 280.

The communication part 210 includes, for example, a communication interface such as an NIC or the like. The communication part 210 performs communication with the information management server 300 via a communication network such as the Internet or the like under control by the application execution part 280.

The input part 220 includes, for example, some or all of a touch panel TP, various keys, buttons, a dial switch, a mouse, and the like, which are formed integrally with the display 230. The display 230 is, for example, a liquid crystal display (LCD), an organic electro luminescence (EL) display device, or the like. The short-distance wireless communication part 240 is, for example, a wireless module used for Bluetooth (registered mark) or the like, and has an antenna, a transceiver, and the like.

The storage 250 is realized by, for example, a random access memory (RAM), a read only memory (ROM), a flash memory, an SD card, a register, or the like. The storage 250 stores a location information notification application 251. The location information notification application 251 is a program of displaying an interface configured to use the user terminal device 200 as a moving body that notifies a location of the motorcycle 100 on the display 230, and executing the processing on the basis of the information input via the interface using the user terminal device 200.

The GNSS receiver 260 receives a signal from a GNSS satellite.

The application execution part 280 is realized by executing the location information notification application (program) 251 stored in the storage 250 using a processor such as a CPU or the like. The location information notification application 251 may be, for example, downloaded from another device via the network NW, or may be previously installed on the user terminal device 200.

The application execution part 280 has the same functions as those of the communication controller 131, the location identification part 132, the operating state notification part 133, the surrounding vehicle retrieval part 134, and the transmission controller 137 of the motorcycle 100. For example, the application execution part 280 generates location information indicating the location of the user terminal device 200 identified by the location identification part 132 from a point in time when the application is turned on, and starts continuous transmission of location information with respect to the information management server 300 using the communication part 210. When the application is turned off, the application execution part 280 may stop transmission of location information or the like.

In addition, the application execution part 280 may display the interface configured to select ON or OFF of the ignition switch 114 on the display 230, and generate the above-mentioned IGON information or IGOFF information based on the information input via the interface. In addition, the application execution part 280 may generate the above-mentioned surrounding vehicle number information on the basis of the communication result of vehicle-to-vehicle communication or road-to-vehicle communication with another surrounding vehicle using the short-distance wireless communication part 240.

In addition, when location information, IGON information, IGOFF information, surrounding vehicle number information, and the like, are received from the motorcycle 100 through near field communication, the application execution part 280 may transmit the received pieces of information to the information management server 300 via the network NW.

<Information Management Server>

Figure 4:
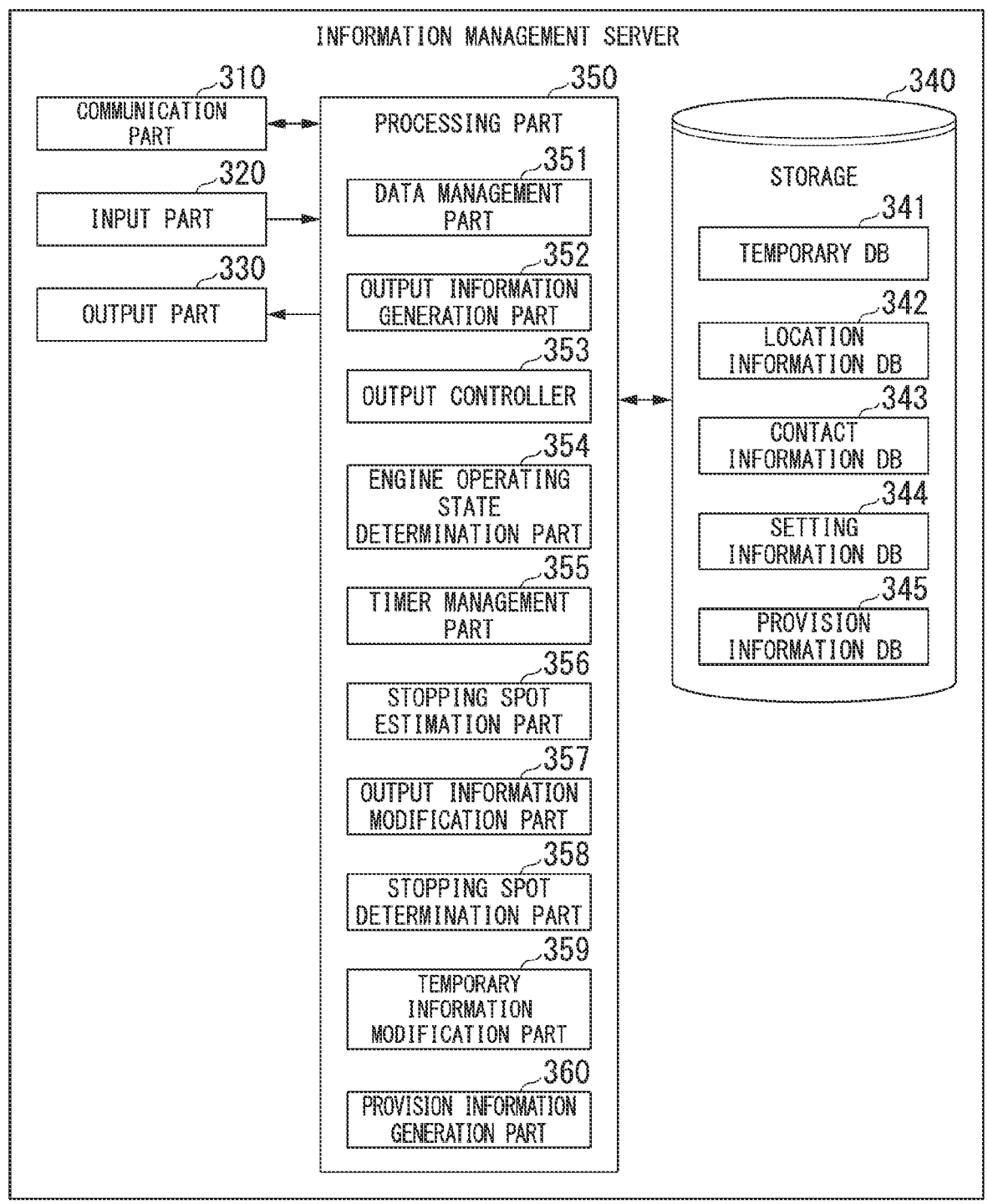
FIG. 4 is a functional block diagram of an information management server 300.

FIG. 4 is a functional block diagram of the information management server 300. The information management server 300 includes, for example, a communication part 310, an input part 320, an output part 330, a storage 340, and a processing part 350.

The communication part 310 includes, for example, a communication interface such as an NIC or the like. The communication part 310 performs communication with the motorcycle 100 or the user terminal device 200 via a communication network such as the Internet or the like under control by the processing part 350.

The input part 320 includes some or all of, for example, various keys, buttons, a dial switch, a mouse, and the like. The output part 330 includes, for example, an LCD, an organic EL display device, a speaker, a projector, and the like. The storage 340 is realized by, for example, a RAM, a ROM, an HDD, or the like. The storage 340 stores a program executed by a processor, and further stores a temporary DB 341, a location information DB 342, a contact information DB 343, a setting information DB 344, a provision information DB 345, and the like. The contact information DB 343 includes information received from the motorcycle 100 or the user terminal device 200, i.e., information in which IGON information, IGOFF information, and surrounding vehicle number information are associated with information indicating date and time when each piece of information is generated. The setting information DB 344 includes information indicating the following set time or the like. Details of other information will be described below.

The processing part 350 includes, for example, a data management part 351, an output information generation part 352, an output controller 353, an engine operating state determination part 354, a timer management part 355, a stopping spot estimation part 356, an output information modification part 357, a stopping spot determination part 358, a temporary information modification part 359, and a provision information generation part 360. Some or all of these function units is realized by executing a program (software) stored in a storage using a processor such as a CPU or the like. In addition, some of all of functions of these components may be realized by hardware (a circuit part: including circuitry) such as an LSI, an ASIC, an FPGA, or the like, or may be realized by cooperation of software and hardware. The program may be stored in a storage device such as an HDD, a flash memory, or the like, in advance, stored in a detachable medium such as a DVD, a CD-ROM, or the like, or installed by mounting the medium in a drive device.

The data management part 351 stores the information received from the motorcycle 100 or the user terminal device 200 via the communication part 310 in the storage 340 as a part of the temporary DB 341. The temporary DB 341 is a database that stores information received from the motorcycle 100 or the user terminal device 200.

Figure 5:
FIG. 5 is a view showing an example of contents of a temporary DB 341 and a location information DB 342.

FIG. 5 is a view showing an example of contents of the temporary DB 341 and the location information DB 342. The temporary DB 341 is information in which, for example, measurement date and time are associated with a vehicle ID, location information, and presence/absence of blur setting. The measurement date and time is information indicating the date and time when the location of the motorcycle 100 was measured. The vehicle ID is information for identifying each of the motorcycles 100. Blur setting is information that sets blurring and saving in the storage 340. Blurring and saving in the storage 340 includes, for example, blurring and displaying when browsing the DB, and displaying it with mosaic.

The output information generation part 352 generates information (hereinafter, referred to as output information) to be output to the output part 330 on the basis of the temporary DB 341. For example, the output information generation part 352 generates output information for outputting the location information indicating the location of the motorcycle 100 to the output part 330 when a predetermined condition is satisfied.

For example, the output information generation part 352 generates output information on the basis of the location information stored in the temporary DB 341 from startup to stopping of the engine 118 of the motorcycle 100 when the stopping spot estimation part 356 estimates that a stopping spot of the motorcycle 100 is not a user's private spot. The private spot includes, for example, a user's house or a place where the user lives like a house. A procedure that generates output information with such timing is hereinafter referred to as a procedure A.

Not limited to this, after the location information is stored in the temporary DB 341 and before the stopping spot estimation part 356 estimates that the stopping spot of the motorcycle 100 is not the user's private spot, the output information generation part 352 may generate output information sequentially based on the temporary DB 341. A procedure that generates output information with such timing is hereinafter referred to as a procedure B.

In the embodiment, the output information generation part 352 stores a copy of the information stored in the temporary DB 341 in the location information DB 342 using the procedure A or the procedure B.

As shown in FIG. 5, the location information DB 342 is, for example, information in which the vehicle ID, location information, and presence or absence of the blur setting are associated with the measurement date and time. Presence or absence of the blur setting is information in which blur setting sets outputting from the output part 330 with blur. Outputting from the output part 330 with blur includes, for example, blurring and displaying the image, and displaying the image with mosaic.

The output controller 353 outputs the information indicating the location of the motorcycle 100 from the output part 330 on the basis of the output information generated by the output information generation part 352. For example, the output controller 353 outputs a map image obtained by displaying a moving route that continuously displays the past location information of the motorcycle 100 on a map from the output part 330 on the basis of the location information DB 342. That is, the location information DB 342 is an example of the output information. Further, when a part of the location information DB 342 is modified by the output information modification part 357, the information indicating the modified location of the motorcycle 100 is output from the output part 330 on the basis of the location information DB 342 after modification. Details of the modified contents will be described below.

The engine operating state determination part 354 determines an operating state of the engine 118 of the motorcycle 100 on the basis of the information received from the motorcycle 100 or the user terminal device 200 using the communication part 310. Here, while an example in which the engine operating state determination part 354 determines the operating state of the engine 118 will be described, there is no limitation thereto. The engine operating state determination part 354 may determine an operating state of the motor, or may determine an operating state of an ignition or ACC (accessory switch). The operating state of the ACC includes, for example, the state before starting the engine, in which electric power is supplied from the vehicle power source to an air conditioner, a radio, etc., although the engine is not started.

For example, the engine operating state determination part 354 determines that it is timing of startup of the engine 118 (hereinafter, referred to as IGON timing) when IGON information is received, and determines that is timing of stopping of the engine 118 (hereinafter, referred to as IGOFF timing) when IGOFF information is received. Not limited to this, the engine operating state determination part 354 may determine the timing when the location information starts moving as the IGON timing on the basis of the location information received from the motorcycle 100 or the user terminal device 200, and determine the timing when the engine stops as IGOFF timing when the location information is stopping for more than the predetermined time.

The timer management part 355 manages a clocking time of an IGOFF timer on the basis of the determination result by the engine operating state determination part 354. The timer management part 355 sets a value of an IGOFF timer flag="0" until the clocking time by the IGOFF timer passes through a set time T, and sets a value of the IGOFF timer flag="1" when the clocking time by the IGOFF timer passes through the set time T. In the embodiment, the set time is a reference time TO, for example, 8 hours.

For example, the timer management part 355 counts the elapsed time from the IGON timing with the point in time determined to be the IGON timing by the engine operating state determination part 354 as the starting point. The timer management part 355 switches the IGOFF timer flag to "1" when the counted elapsed time reaches the set time TO. Meanwhile, when the IGOFF timing is determined by the engine operating state determination part 354, the timer management part 355 resets and switches the IGOFF timer flag to "0."

The stopping spot estimation part 356 estimates that the stopping spot of the motorcycle 100 is a user's house when the state transition of the ignition switch 114 of the motorcycle 100 satisfies a predetermined condition, and estimates that the stopping spot of the motorcycle 100 is other than the user's house when the state transition of the ignition switch 114 of the motorcycle 100 does not satisfy the predetermined condition. The state transition of the ignition switch 114 of the motorcycle 100 may include sequence or combination of the timing when the ignition switch 114 is turned on and the timing when the ignition switch 114 is turned off, elapsed time from both the timings, a length of an interval between both the timings, and the like. In the embodiment, the stopping spot estimation part 356 determines whether the state transition of the ignition switch 114 of the motorcycle 100 satisfies the predetermined condition on the basis of the value of the IGOFF timer flag, and estimates the stopping spot of the motorcycle 100.

For example, the stopping spot estimation part 356 estimates that the stopping spot of the motorcycle 100 is the user' private spot when the condition that more than the set time T has passed from the point in time when the ignition switch 114 was turned off after the ignition switch 114 is turned on and then the ignition switch 114 is turned off is satisfied. Specifically, when IGOFF timer flag="1," the stopping spot estimation part 356 estimates that the stopping spot of the motorcycle 100 is the user's private spot.

Meanwhile, the stopping spot estimation part 356 estimates that the stopping spot of the motorcycle 100 is not the user's private spot when the condition that the ignition switch 114 is turned on again after the ignition switch 114 is turned off and before the set time T passes from the point in time when the ignition switch 114 is turned off is satisfied. Specifically, when IGOFF timer flag="0," the stopping spot estimation part 356 estimates that the stopping spot of the motorcycle 100 is not the user' private spot.

The output information modification part 357 modifies the output information on the basis of the location information of the motorcycle 100 estimated as being located at the user's private spot by the stopping spot estimation part 356. For example, the output information modification part 357 deletes the location information corresponding to the predetermined area including the user' private spot from the location information DB 342. Not limited to this, the output information modification part 357 may add a flag to the presence or absence of the blur setting for the location information of the location information DB 342 such that the location information corresponding to the predetermined area including the private spot can be blurred and output from the output part 330.

The stopping spot determination part 358 determines that the stopping spot of the motorcycle 100 is the user's private spot when the condition that more than a set time LongT passes from the point in time when the ignition switch 114 is turned off is satisfied after the ignition switch 114 is turned on and then the ignition switch 114 is turned off. Specifically, a fourth embodiment will be described.

The temporary information modification part 359 modifies some output information of the temporary DB 341 on the basis of the location information of the motorcycle 100 determined as being located at the user's private spot by the stopping spot determination part 358. For example, the temporary information modification part 359 deletes the location information corresponding to the predetermined private area including the stopping spot determined as the user's private spot by the stopping spot determination part 358 from the temporary DB 341. Not limited to this, the temporary information modification part 359 may add a flag to the location information of the temporary DB 341 for the presence or absence of a blur setting so that the location information corresponding to the private area can be blurred and stored.

The provision information generation part 360 generates provision information provided to the motorcycle 100 or the user terminal device 200 on the basis of the location information DB 342, stores the provision information in the provision information DB 345, and transmits the provision information read from the provision information DB 345 to the motorcycle 100 or the user terminal device 200 using the communication part 310. In this way, by using the information referenced when the provision information is generated as the location information DB 342, it is possible to secure anonymity of the motorcycle 100 or the user terminal device 200 even when the provision information is generated.

<Sequence Diagram>

Figure 6:
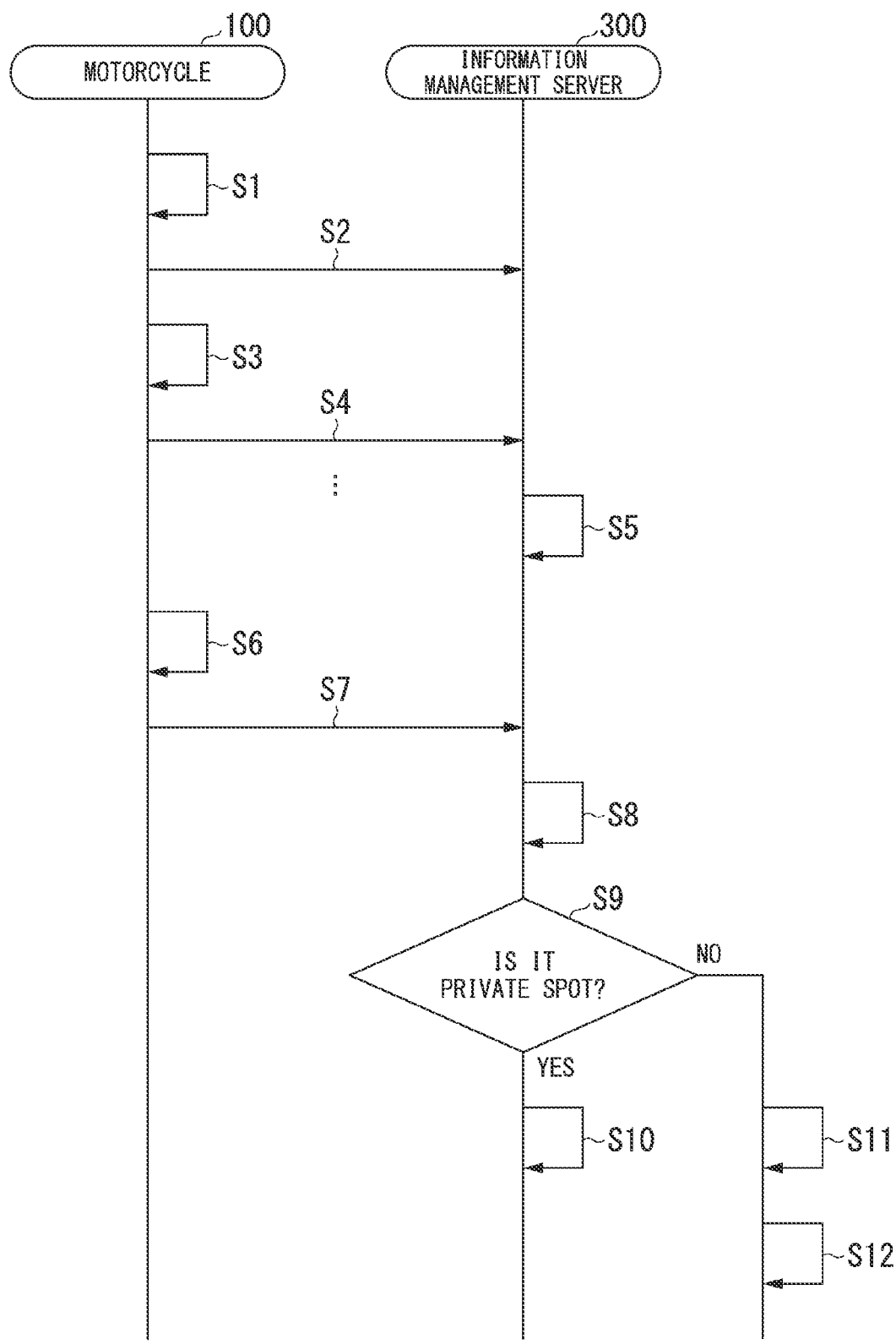
FIG. 6 is a sequence diagram showing an example of processing in the location information output system 1.

FIG. 6 is a sequence diagram showing an example of processing in the location information output system 1. As described above, here, an example in which the information acquired by the motorcycle 100 is notified to the manager will be described below. In addition, here, an example that employs the procedure A will be described.

First, when the ignition switch 114 is turned on, the motorcycle 100 generates IGON information (step S1), and transmits it to the information management server 300 via the network NW (step S2).

Next, the motorcycle 100 generates vehicle information including location information or the like (step S3), and transmits it to the information management server 300 via the network NW (step S4). The information management server 300 stores the received vehicle information in the temporary DB 341 (step S5). The location information is continuously generated and continuously stored in the temporary DB 341.

Then, when the ignition switch 114 is turned off, the motorcycle 100 generates IGOFF information (step S6), and transmits it to the information management server 300 via the network NW (step S7). The information management server 300 starts the IGOFF timer when IGOFF information is received (step S8).

Next, the information management server 300 determines whether the spot where the motorcycle 100 stops is a private spot (step S9). When it is determined that the stopping spot of the motorcycle 100 is the private spot, the information management server 300 outputs the information indicating the location of the motorcycle 100 with reference to the location information DB 342 from the output part 330 while deleting or blurring the location information included in the private area defined by the predetermined distance about the private spot (step S10).

Meanwhile, when it is determined that the stopping spot of the motorcycle 100 is not the private spot, the information management server 300 determines whether it is output timing of the location information (step S11). When it is determined that it is the output timing of the location information, the information management server 300 outputs information indicating the location of the motorcycle 100 from the output part 330 without hiding the location information of the stopping spot with reference to the location information DB 342 (step S12).

Next, an example of processing by the information management server 300 will be described for each use case of the motorcycle 100.

Figure 7:
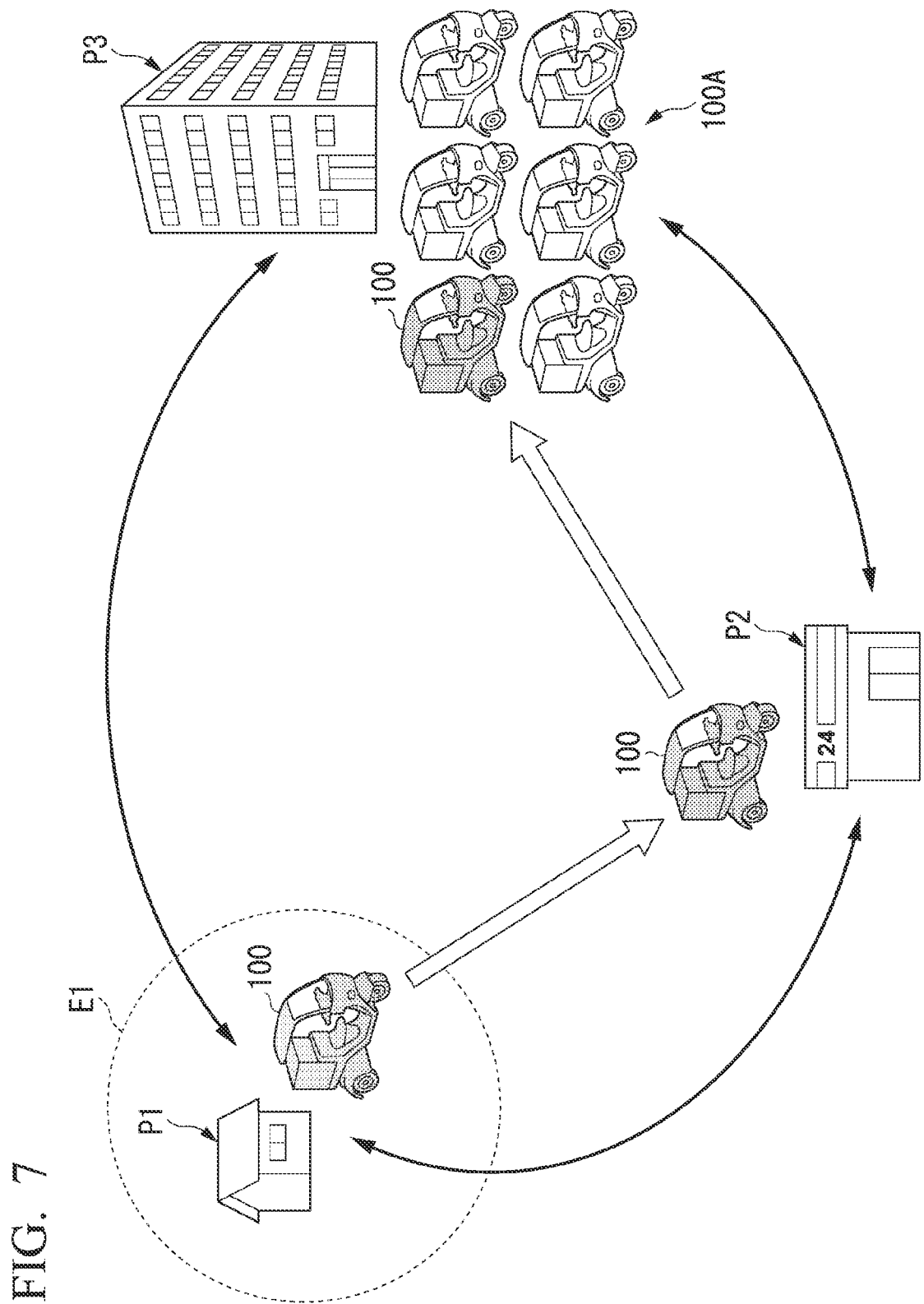
FIG. 7 is a view showing an example of a spot where the motorcycle 100 stops.

FIG. 7 is a view showing an example of a spot where the motorcycle 100 stops. A house P1 is an example of the user' private spot, and a shop P2 and a company P3 are examples of spots that are not the user's private spot. The company P3 has, for example, a parking lot in which a plurality of other vehicles of the same kind are parked. A private area E1 is an area defined by a predetermined distance (for example, 50 m) about the house P1. A surrounding area E3 of an area is in a predetermined range about the motorcycle 100 when the motorcycle stops at the company P3.

<Case 1-1>

For example, it is assumed that the user rides the motorcycle 100, moves from the user's house P1 to the shop P2, and returns home to the house P1. In such use, the user stops the motorcycle 100 at the house P1 for a long time and at the shop P2 for a short time.

The information management server 300 determines that the shop P2 at which a stoppage time of the motorcycle 100 is less than the set time T is not the private spot, and outputs the location information indicating the round trip moving route from the house P1 to the shop P2 from the output part 330 without hiding it. Meanwhile, after arrival at the house P1, when the stoppage time of the motorcycle 100 is equal to or greater than the set time T, the information management server 300 determines that the house P1 is a private spot. In this case, the information management server 300 outputs the location information included in the private area E1 from the output part 330 after deleting or blurring it.

<Case 1-2>

For example, the user rides the motorcycle 100, goes from the user's house P1 to the company P3, goes shopping at the shop P2 for lunch break, returns to the company P3, and after working in the afternoon, and then, comes home to the house P1. In such use, the user parks the motorcycle 100 at the house P1 for a long time, at the shop P2 for a short time, and at the company P3 during working hours in the morning and working hours in the afternoon.

The information management server 300 determines that the shop P2 or the company P3 at which the stoppage time of the motorcycle 100 is less than the set time T is not the private spot, and outputs the location information indicating the moving route from leaving the house P1 to returning home from the output part 330 without hiding it. Meanwhile, after arriving at the house P1, when the stoppage time of the motorcycle 100 is equal to or greater than the set time T, the information management server 300 determines the house P1 as a private spot. In this case, the information management server 300 outputs the location information included in the private area E1 from the output part 330 after deleting or blurring it.

Figure 8:
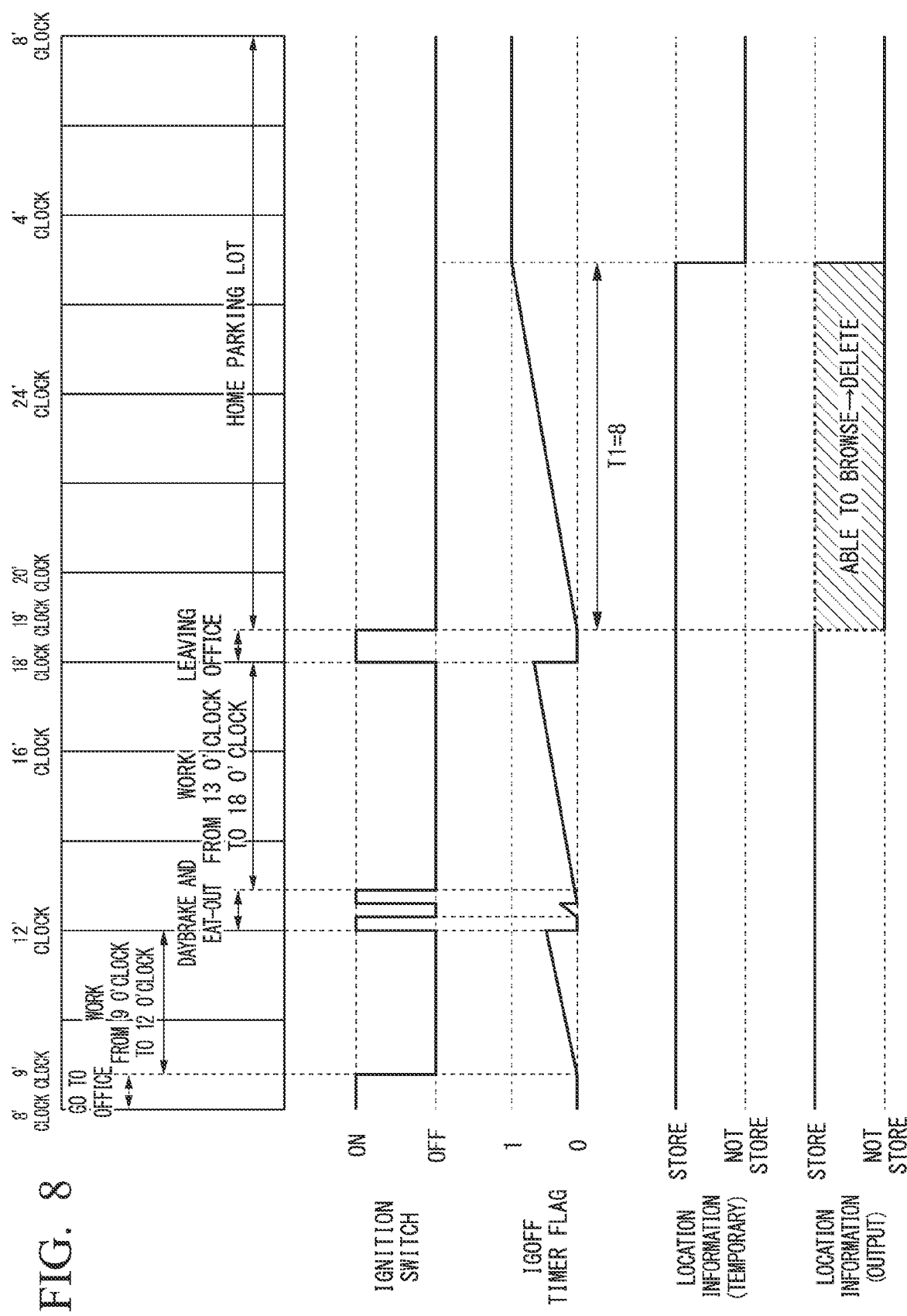
FIG. 8 is a reference view for describing an example of processing of each function unit of the information management server 300 in Case 1-2 as time passes.

FIG. 8 is a reference view for describing an example of processing of each function unit of the information management server 300 in Case 1-2 as time passes. First, details of Case 1-2 will be described. The user gets on the motorcycle 100, turns on the ignition switch 114 at 8 o'clock and leaves the house P1, arrives at the company P3 at 9 o'clock, and turns off the ignition switch 114. When the ignition switch 114 is turned off, clocking time by the IGOFF timer is added. In addition, the motorcycle 100 continuously transmits the measured location information to the information management server 300.

At lunch break, the user gets on the motorcycle 100, turns on the ignition switch 114 at 12 o'clock, leaves the company P3, turns off the ignition switch 114 at the shop P2, and stops the motorcycle. After shopping, the user turns on the ignition switch 114, leaves the shop P2, arrives at the company P3 at 13 o'clock, and turns off the ignition switch 114.

Further, the IGOFF timer is reset by turning on the ignition switch 114 when leaving the company P3 to go to the shop P2, and is reset by turning on the ignition switch 114 when leaving the shop P2 to go to the company P3. Then, when arriving at the company P3 and turning off the ignition switch 114, the clocking time by the IGOFF timer is added.

At company-leaving time, the user gets on the motorcycle 100, turns on the ignition switch 114 at 18 o'clock, leaves the company P3, turns off the ignition switch 114 at 19 o'clock, and stops at the house P1.

Further, the IGOFF timer is reset by turning on the ignition switch 114 when departing from the company P3. Then, when the ignition switch 114 is turned off after arriving at the house P1, the clocking time by the IGOFF timer is added. At 3 o'clock in the middle of the night, since 8 hours of the set time T have passed from 19 o'clock when the ignition switch 114 was turned off, the information management server 300 switches the IGOFF timer flag to "1" and instructs termination of transmission of the measured location information to the motorcycle 100.

Then, the information management server 300 modifies the location information DB 342 so that the location information from 19 o'clock when the person returned to the house P1 to 3 o'clock in the middle of the night is deleted or blurred and displayed.

<Flowchart 1>

Figure 9:
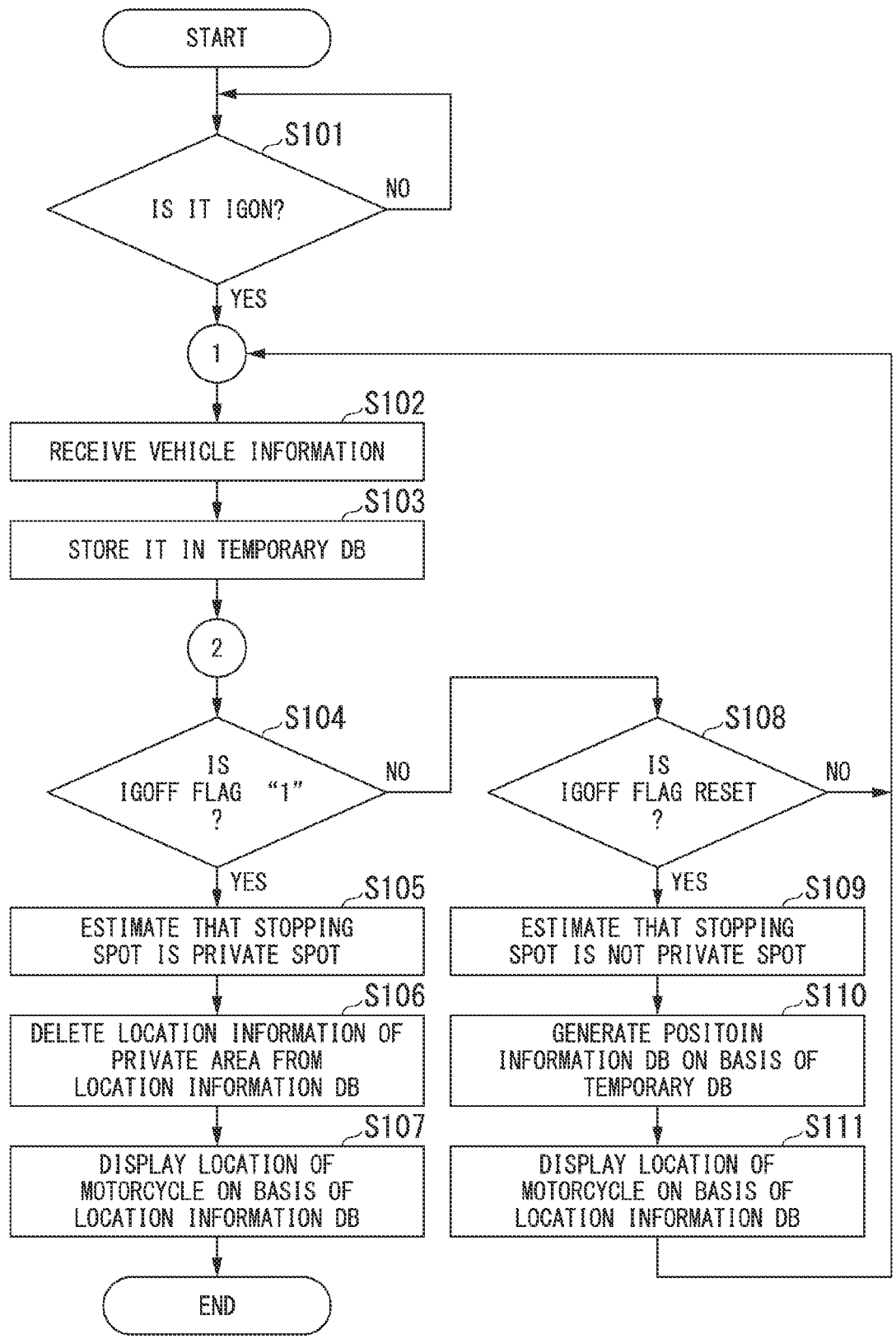
FIG. 9 is a flowchart showing an example of processing (procedure A) by the information management server 300 according to a first embodiment.

FIG. 9 is a flowchart showing an example of processing (the procedure A) by the information management server 300 according to the first embodiment. The information management server 300 determines whether it is the IGON timing (step S101). When it is the IGON timing, the information management server 300 receives the location information from the motorcycle 100 (step S102), and saves it in the temporary DB 341 (step S103).

Next, the information management server 300 determines whether the IGOFF timer flag is "1" (step S104). When the IGOFF timer flag="1," the information management server 300 estimates that the stopping spot is the private spot (step S105), and modifies the location information DB 342 to deletes or blur and display the location information included in the private area (step S106). Then, the information management server 300 outputs the information indicating the location of the motorcycle 100 from the output part 330 with reference to the location information DB 342 after modification (step S107).

Meanwhile, in step S104, when the IGOFF timer flag is not "1," the information management server 300 determines whether the IGOFF timer flag is reset (step S108). When the IGOFF timer flag is reset, i.e., when the ignition switch 114 is turned on after the motorcycle 100 stops, the information management server 300 estimates that the stopping spot is not the private spot (step S109). Then, the information management server 300 copies the location information in a period from ON to OFF of the ignition switch 114 on the basis of the temporary DB 341 and stores it in the location information DB 342 (step S110), and outputs the information indicating the location of the motorcycle 100 from the output part 330 with reference to the location information DB 342 (step S111).

Meanwhile, when the IGOFF timer flag is not reset in step S108, the information management server 300 returns to step S102 and repeats the processing.

<Flowchart 2>

Figure 10:
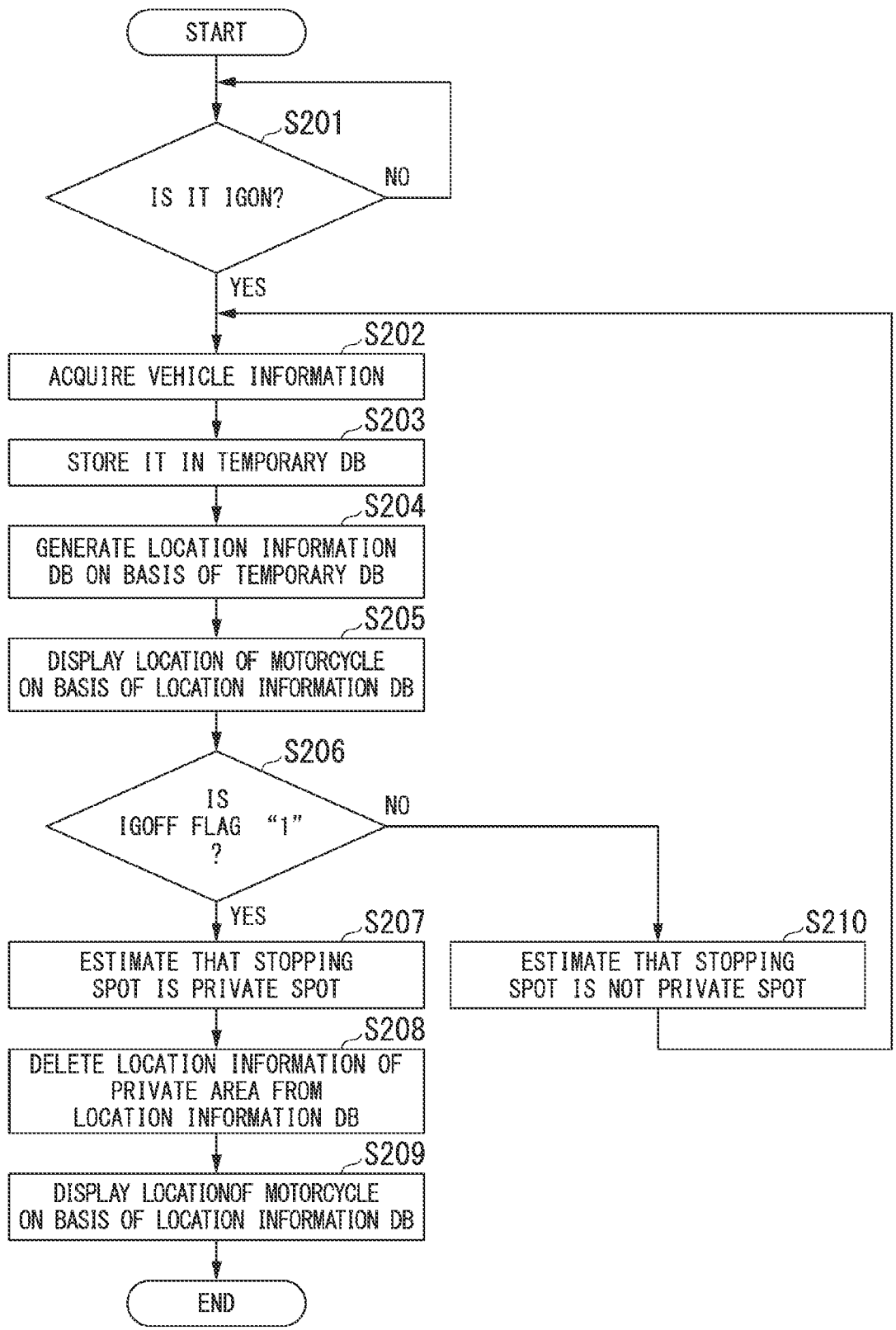
FIG. 10 is a flowchart showing an example of processing (procedure B) by the information management server 300 according to the first embodiment.

FIG. 10 is a flowchart showing an example of processing (the procedure B) by the information management server 300 according to the first embodiment. The information management server 300 determines whether it is the IGON timing (step S201). When it is the IGON timing, the information management server 300 receives the vehicle information from the motorcycle 100 (step S202), and saves it in the temporary DB 341 (step S203). Then, the information management server 300 copies the updated location information on the basis of the temporary DB 341 and stores it in the location information DB 342 (step S204), and outputs the information indicating the location of the motorcycle 100 from the output part 330 with reference to the location information DB 342 (step S205).

Next, the information management server 300 determines whether the IGOFF timer flag is "1" (step S206). When the IGOFF timer flag="1," the information management server 300 estimates that the stopping spot is the private spot (step S207), and modifies the location information DB 342 to delete or blur and display the location information included in the private area (step S208). Then, the information management server 300 outputs the information indicating the location of the motorcycle 100 from the output part 330 with reference to the location information DB 342 after modification (step S209).

Meanwhile, in step S210, when the IGOFF timer flag is not "1," the information management server 300 estimates that the stopping spot is not the private spot (step S210), and returns to step S202 and repeats the processing.

According to the above-mentioned first embodiment, a computer can secure anonymity of the current location of a moving body by acquiring location information from a moving body via a network, the location information indicating a location measured by a location measuring device (113, 260) mounted on the moving body which includes at least one of a vehicle (100) and a terminal device (200) owned by an occupant of the vehicle, determining an operating state of an engine of the vehicle on the basis of the information received from the moving body via the network, in a case a transition of the operating state of the vehicle satisfies a predetermined condition, estimating that a time point when the engine of the vehicle is OFF is an occupant's private spot, and outputting information indicating that the moving body is present at the position indicated by the location information from an output part (330) on the basis of the location information in which the location information, which corresponds to the predetermined area including the private spot of the occupant, is excluded. In addition, since the user does not need input works such as initial setting or the like, the user's burden can be reduced. In addition, the information management server 300 can estimate the user's private spot by simple processing of measuring the elapsed time based on the information received from the vehicle, and can also reduce the load on the side of the information management server 300.

Further, when the location information of the place that may be estimated as the user's private spot is notified as it is, the house or the like may be estimated from the user's location information, and there is a possibility that the user's house or the like will be known to the third party. When the stopping spot of the motorcycle 100 is estimated as the user's private spot, by deleting or blurring and displaying it from the location information DB 342, anonymity can be maintained and the location information of the motorcycle 100 can be managed without setting an area where the user himself/herself prohibits notification.

Second Embodiment

Hereinafter, a second embodiment will be described. In the first embodiment, the example of determining whether the stopping spot is the private spot based on the IGOFF timer flag has been described. In the second embodiment, the ignition switch 114 of the motorcycle 100 sets a set time of an IGOFF timer flag according to a time period of an off state, and like the first embodiment, an example of determining whether a stopping spot is a private spot or not will be described. Hereinafter, the description will focus on the differences from the first embodiment.

<Case 2>

For example, it is assumed that the user rides the motorcycle 100, goes home from the company P3 to the house P1 at late night, and goes to work from the house P1 to the company P3 early in the morning. In such use, the user stops the motorcycle 100 at the house P1 from the late night until the early morning, and stops at the company P3 for a long time. In this case, there is a case in which the stoppage time at the house P1 becomes shorter and the stoppage time at the company P3 becomes longer.

In the embodiment, the information management server 300 acquires a time period of the IGOFF state in which the engine 118 of the motorcycle 100 is stopping, and changes the set time T in the IGOFF timer flag according to the set time period that includes at least part of the time period of the acquired IGOFF state. The IGOFF state is a state in which the ignition switch 114 is turned off. The set time period includes, for example, a set late night time period, and a set daytime period. The set late night time period is, for example, a time period from 0 o'clock to 4 o'clock. The set daytime period is, for example, a time period from 10 o'clock to 14 o'clock. That is, a time period except the set time period is, for example, a time period from 4 o'clock to 10 o'clock and from 14 o'clock to 24 o'clock.

For example, when at least a part of the time period of the acquired IGOFF state is included in the set late night time period, the set time T=T1 is registered in the setting information DB 344. The set time T1 is, for example, 4 hours. In addition, when at least a part of the time period of the acquired IGOFF state is included in the set daytime period, the set time T=T2 (>T1) is registered in the setting information DB 344. The set time T2 is longer than the set time T1, for example, 12 hours.

The timer management part 355 determines whether at least one of the time of the IGOFF timing and the time of the IGON timing is included in the set late night time period with reference to the setting information DB 344. When at least one of the time of the IGOFF timing and the time of the IGON timing is included in the set late night time period, the timer management part 355 sets the set time T=T1 in the IGOFF timer flag. Further, even if the IGOFF timing is included in the time period other than the set late night time period, when the set late night time period has reached while remaining in the IGOFF state, the timer management part 355 will set the set time T of the IGOFF timer flag=T1.

Then, when an elapsed time of the IGOFF timer is equal to or greater than the set time T1, the stopping spot estimation part 356 determines that the stopping spot of the motorcycle 100 is the private spot. Meanwhile, when the elapsed time of the IGOFF timer is less than the set time T1, the stopping spot estimation part 356 determines that the stopping spot of the motorcycle 100 is not the private spot.

In addition, the timer management part 355 determines whether at least one of the time of IGOFF timing and the time of IGON timing is included in the set daytime period with reference to the setting information DB 344. When at least one of the time of the IGOFF timing and the time of the IGON timing is included in the set daytime period, the timer management part 355 sets the set time T of the IGOFF timer flag=T2. Further, even if the IGOFF timing is included in the time period other than the set daytime period, when the set daytime period has reached while in the IGOFF state, the timer management part 355 sets the set time T of the IGOFF timer flag=T2.

Then, when the elapsed time of the IGOFF timer is equal to or greater than the set time T2, the stopping spot estimation part 356 determines that the stopping spot of the motorcycle 100 is the private spot. Meanwhile, when the elapsed time of the IGOFF timer is less than the set time T2, the stopping spot estimation part 356 determines that the stopping spot of the motorcycle 100 is not the private spot.

Figure 11:
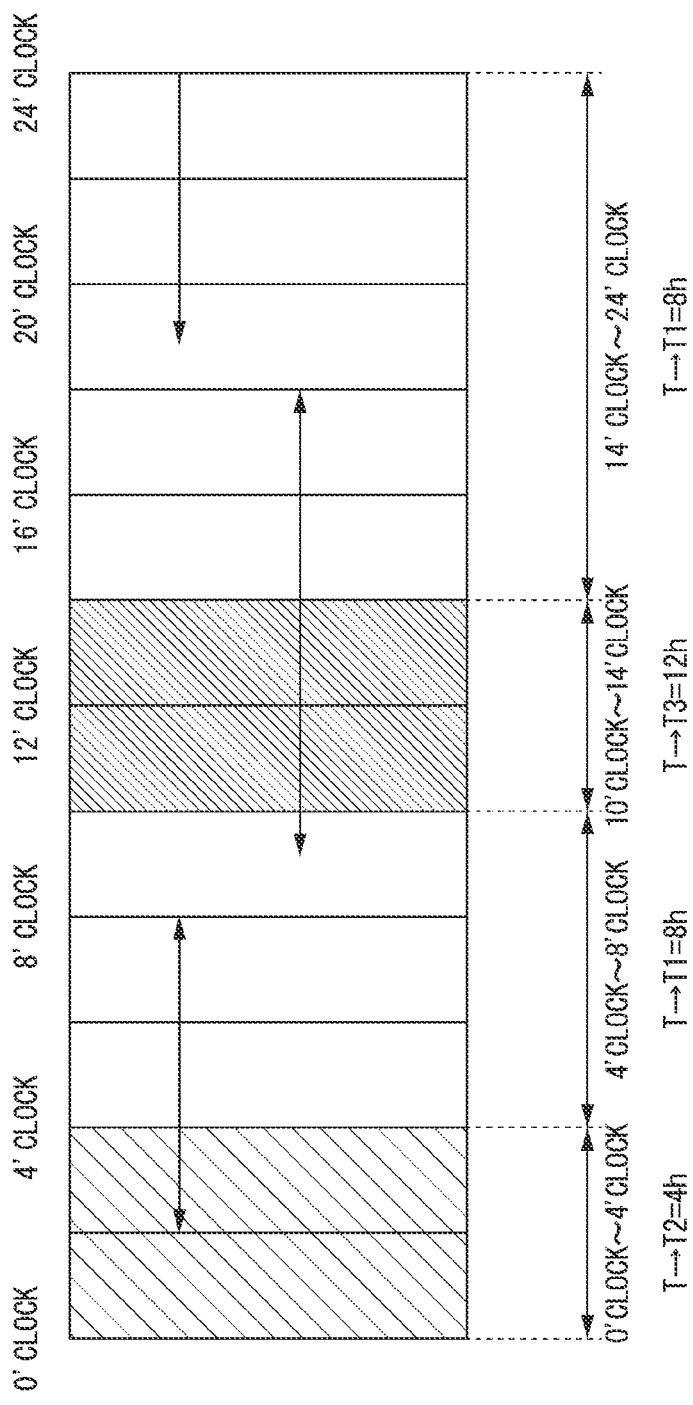
FIG. 11 is a reference view for describing an example of processing by the information management server 300 according to a second embodiment.

FIG. 11 is a reference view for describing an example of processing by the information management server 300 according to the second embodiment. First, details of Case 2 will be described. The user gets on the motorcycle 100, goes home from the company P3, arrives at the house P1 at late night 2 o'clock, and turns off the ignition switch 114. After that, the user turns on the ignition switch 114 at 8 o'clock on the same day, leaves the house P1, arrives at the company P3 at 9 o'clock, and turns off the ignition switch 114. Then, the user does not turn on the ignition switch 114 of the motorcycle 100 from the time the user arrived at the company P3 to the time the user leaves the company, turns on the ignition switch 114 at 18 o'clock which is a company-leaving time and leaves the company P3, and turns off the ignition switch 114 at 19 o'clock and stops at the house P1.

<Flowchart 3>

Figure 12:
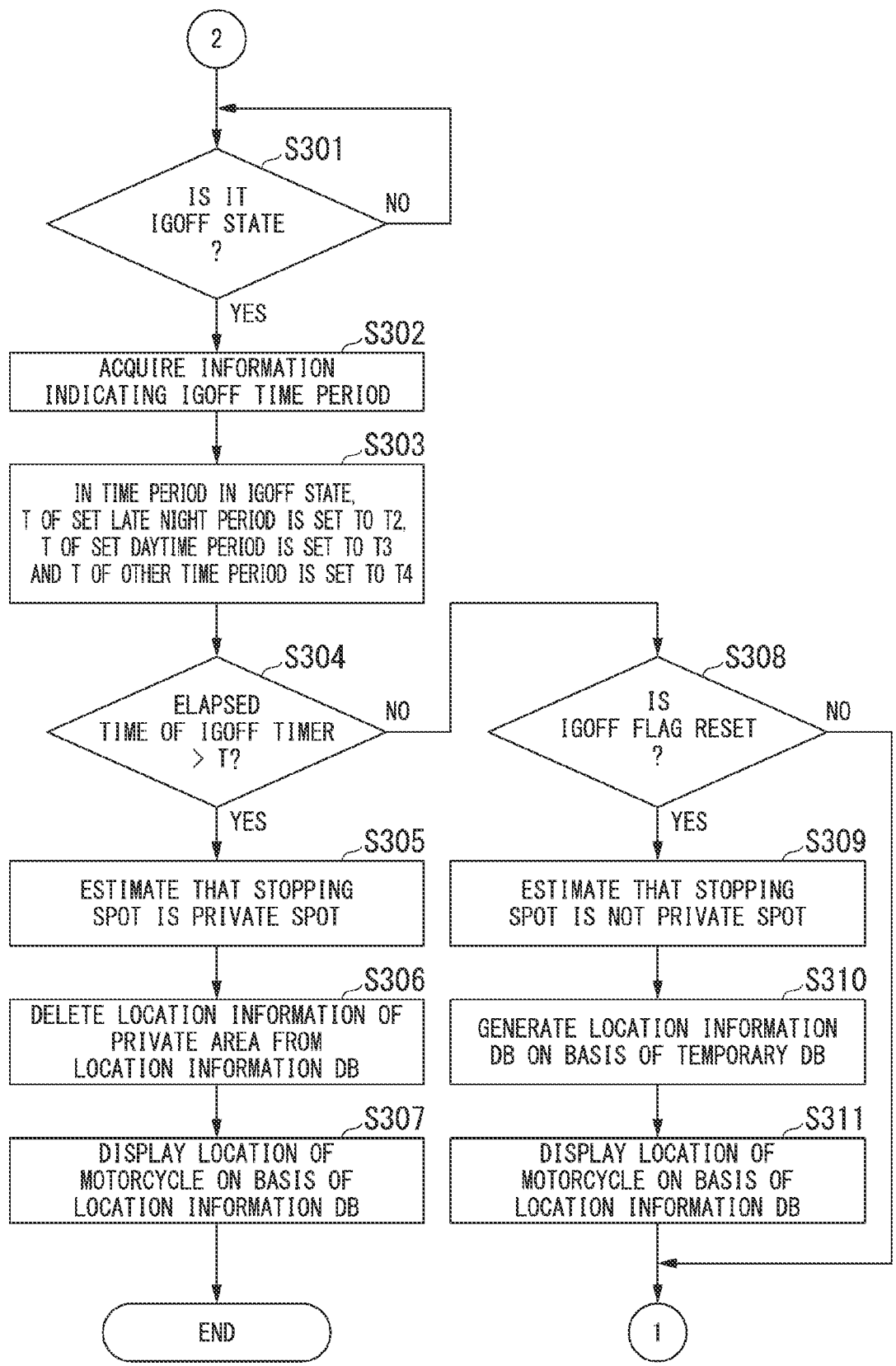
FIG. 12 is a flowchart showing an example of processing by the information management server 300 according to the second embodiment.

FIG. 12 is a flowchart showing an example of processing by the information management server 300 according to the second embodiment. While not shown, as described above, the information management server 300 determines whether it is the IGON timing (step S101). When it is the IGON timing, the information management server 300 receives the vehicle information from the motorcycle 100 (step S102), and saves it in the temporary DB 341 (step S103).

Next, the information management server 300 determines whether it is the IGOFF state (step S301). When it is the IGOFF state, the information indicating the time period of the IGOFF state is acquired (step S302). The information indicating the time period of the IGOFF state includes the IGOFF timing or the IGON timing. Next, the information management server 300 determines the set time T according to the set time period in which at least a part of the acquired IGOFF state is included (step S303).

For example, as described above, when returning home to the house P1 at late night 2 o'clock, the information management server 300 determines the set time T=T1 because the IGOFF timing is included in the set late night time period. Meanwhile, when a user goes to work at 8 o'clock and stops at the company P3 at 9 o'clock, the IGOFF timing is other time period, but the IGON timing is 18 o'clock, and a part of the IGOFF state overlaps the set daytime period. Accordingly, the information management server 300 sets the set time T=T2.

Next, the information management server 300 determines whether the clocking time by the IGOFF timer is equal to or greater than the set time T (step S304). When it becomes the clocking time by the IGOFF timer≥T, the information management server 300 estimates that the stopping spot is the private spot (step S305), and modifies the location information DB 342 to delete or blur and display the location information included in the private area (step S306). Then, the information management server 300 outputs the information indicating the location of the motorcycle 100 from the output part 330 with reference to the location information DB 342 after modification (step S307).

For example, when a user returns to the house P1 at late night 2 o'clock, the set time T=T1 (4 h), so at 6 o'clock, it becomes the clocking time by the IGOFF timer≥T. Since the motorcycle 100 is continuously in the IGOFF state until 8 o'clock, the information management server 300 estimates the house P1 that is the stopping spot as a private spot.

Meanwhile, in step S304, when the clocking time by the IGOFF timer is not ≥T, the information management server 300 determines whether the IGOFF timer flag is reset (step S308). When the IGOFF timer flag is reset, i.e., when the ignition switch 114 is turned on after the motorcycle 100 stops, the information management server 300 estimates that the stopping spot is not the private spot (step S309). Then, the information management server copies the location information of the period from ON to OFF of the ignition switch 114 on the basis of the temporary DB 341 and stores it in the location information DB 342 (step S310), and outputs the information indicating the location of the motorcycle 100 from the output part 330 with reference to the location information DB 342 (step S311).

For example, when a user goes to work at 8 o'clock and stops at the company P3 at 9 o'clock, since it becomes the set time T=T2 (12 h), and if the ignition switch 114 is turned on at 18 o'clock, the period of the IGOFF state is 9 hours, and the clocking time by the IGOFF timer is not ≥T. Accordingly, the information management server 300 estimates that the company P3, which is the stopping spot, is not the private spot.

According to the above-mentioned second embodiment, even if the stoppage time in the middle of the night is less than a normal set time of 8 hours, if the stoppage time is 4 hours or more, the spot where the vehicle stops in the middle of the night can be estimated to be the house P1. In addition, even if the stoppage time during the day is more than 8 hours of the normal set time, if the stoppage time is not equal to or greater than 12 hours, it can be estimated that the spot where the vehicle stops during the day is not the house P1. In this way, by changing the length of the set time according to the time period, under the assumption that the spot where the vehicle stops at night is the house P1 and the spot where the vehicle stops during the day is the company P3, it is possible to more appropriately estimate whether the spot is the private spot.

Third Embodiment

Hereinafter, a third embodiment will be described. In the third embodiment, an example will be described in which, when a condition that the number of other vehicles around the motorcycle 100 is equal to or smaller than a threshold is satisfied, in addition to the condition of the first embodiment (the IGOFF timer flag is 1) or the condition of the second embodiment (the IGOFF timer flag is 1 in a state in which the set time of the IGOFF timer flag is set according to the time period of the IGOFF state), it is determined that the stopping spot is the private spot. Hereinafter, description will focus on the differences from the first embodiment.
<Case 3>

For example, it is assumed that the user rides the motorcycle 100, goes to work from the house P1 to the company P3 early in the morning, and returns home from the company P3 to the house P1 at midnight. In such use, the user may stop the motorcycle 100 at the company P3 for a long time.

In the embodiment, the motorcycle 100 communicates with other similar vehicles existing in the surrounding area E3 of the host vehicle, and calculates the number of similar other vehicles existing in the surrounding area D3 (hereinafter referred to as a surrounding vehicle number). The surrounding area E3 is an area in a predetermined range about the motorcycle 100. The similar other vehicles include a vehicle of the same model as the motorcycle 100, a vehicle of the same type as the motorcycle 100, and a vehicle of the same manufacturer as the motorcycle 100. If there are a large number of the same other vehicles in the surrounding area D3, it is assumed that the vehicles are in a parking lot such as the company P3. The motorcycle 100 transmits information indicating the calculated surrounding vehicle number (surrounding vehicle number information described above) to the information management server 300.

The information management server 300 receives the surrounding vehicle number information using the communication part 310. The stopping spot estimation part 356 estimates that the point in time when the engine 118 of the motorcycle 100 is turned OFF is the private spot when the elapsed time from the point in time when the engine 118 of the motorcycle 100 is turned OFF is equal to or greater than the set time T and when the surrounding vehicle number is less than a threshold N. Meanwhile, even if the elapsed time from the point in time when the engine 118 of the motorcycle 100 is turned OFF is equal to or greater than the set time T, when the surrounding vehicle number is equal to or greater than the threshold N, the stopping spot estimation part 356 estimates that the point in time when the engine 118 of the motorcycle 100 is turned OFF is not the private spot. The threshold N is, for example, 10.
<Flowchart 4>

Figure 13:
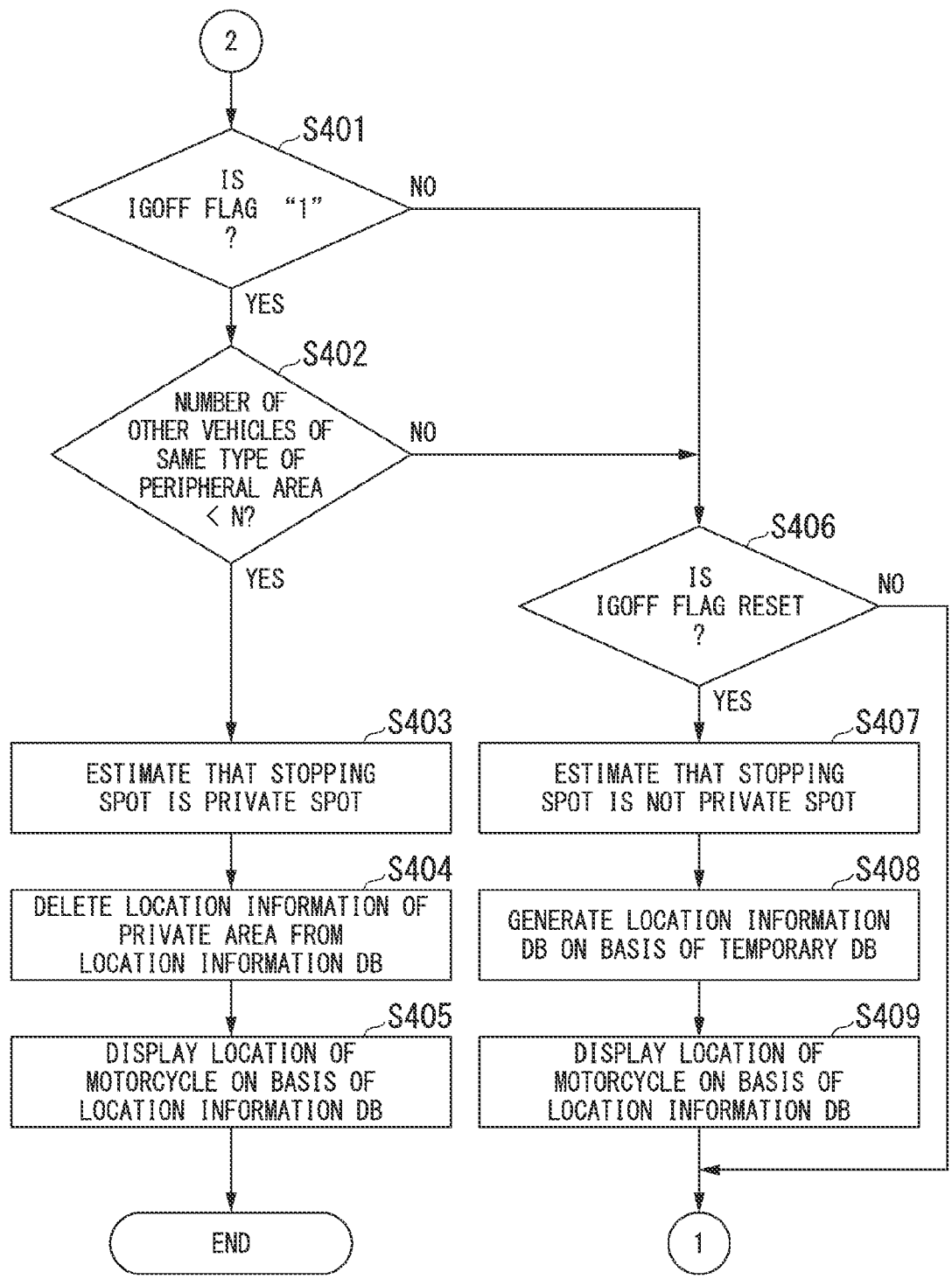
FIG. 13 is a flowchart showing an example of processing by the information management server 300 according to a third embodiment.

FIG. 13 is a flowchart showing an example of processing by the information management server 300 according to the third embodiment. While not shown, as described above, the information management server 300 determines whether it is the IGON timing (step S101). When it is the IGON timing, the information management server 300 receives the vehicle information from the motorcycle 100 (step S102), and stores it in the temporary DB 341 (step S103).

Next, the information management server 300 determines whether the IGOFF timer flag is "1" (step S401). When the IGOFF timer flag="1," the information management server 300 determines whether the surrounding vehicle number is less than the threshold N (step S402). When the surrounding vehicle number is less than the threshold N, the information management server 300 estimates that the stopping spot is the private spot (step S403), and modifies the location information DB 342 so as to delete or blur and display the location information included in the private area (step S404). Then, the information management server 300 outputs the information indicating the location of the motorcycle 100 from the output part 330 with reference to the location information DB 342 after modification (step S405).

Meanwhile, in step S402, when the surrounding vehicle number is equal to or greater than the threshold N, the information management server 300 determines whether the IGOFF timer flag is reset (step S406). When the IGOFF timer flag is reset, i.e., when the ignition switch 114 is turned on after the motorcycle 100 stops, the information management server 300 estimates that the stopping spot is not the private spot (step S407). Then, the information management server 300 copies the location information of the period from ON to OFF of the ignition switch 114 and stores it in the location information DB 342 on the basis of the temporary DB 341 (step S408), and outputs the information indicating the location of the motorcycle 100 from the output part 330 with reference to the location information DB 342 (step S409).

Meanwhile, when the IGOFF timer flag is not reset in step S406, the information management server 300 returns to step S102 and repeats the processing.

According to the above-mentioned third embodiment, even if the company P3 has longer working hours and the stoppage time is more than 8 hours of the normal set time T, when the same other vehicles are parked to the threshold N or more, it can be estimated that it is not the user's private spot. By doing this, when the same other vehicles are parked in the company P3 or the like where a large number of vehicles may be parked in the vicinity of the threshold N or more, there is no need to maintain anonymity, and the location information can be notified. In addition, in addition to the stoppage time being equal to or greater than the set time T, by estimating that it is the user's private spot under the condition that the same other vehicles parked in the vicinity are less than the threshold N, it is possible to more appropriately estimate whether it is the private spot under the assumption that a parking lot where many other vehicles are parked is not the private spot.

Fourth Embodiment

Hereinafter, a fourth embodiment will be described. In the fourth embodiment, an example will be described in which, in the procedure of any one of the first to third embodiments, after it is estimated that the stopping spot of the motorcycle 100 is the user's private spot, whether the estimated stopping spot is really the user's private spot is determined by another criterion. Then, when it is estimated and determined as being the user's private spot, it is deleted from the temporary DB 341 and it is estimated as being the user's private spot, but when it is determined as being not the user's private spot after that, it is not deleted from the temporary DB 341. Hereinafter, the description will focus on the differences from the first embodiment.
<Case 4>

For example, it is assumed that the user gets on the motorcycle 100 and stops at the house P1, and the clocking time by the IGOFF timer exceeds the set time T. In this case, it is estimated that the stopping spot of the motorcycle 100 is the user's private spot. After that, the user may not use the motorcycle 100 even the next day, and in this case, the possibility that the stopping spot of the motorcycle 100 is the user's private spot increases further. Here, when the clocking time by the IGOFF timer is equal to or greater than the set time LongT, since there is a high possibility that the stopping spot of the motorcycle 100 is the user's private spot, the location information of the private area is set to be deleted from the temporary DB 341 or blurred and stored therein. The set time LongT is longer than the set time T, for example, 48 hours. By doing this, whether it is the private spot can be more appropriately estimated. In addition, by deleting the information from the temporary DB 341, it is possible to reduce the storage capacity of the temporary DB 341 and further improve the anonymity of the user.

Meanwhile, it is supposed that a thief transports the motorcycle 100 without permission from the owner of the motorcycle 100 and hides it in a warehouse. In this case, even if the motorcycle 100 has been parked in the warehouse for an extended period of time, the stopping spot should not be considered as the private spot. In the embodiment, even if the IGOFF state of the motorcycle 100 exceeds the set time T, when the predetermined condition is satisfied, by not estimating that it is a user's private spot, the location information is prevented from being deleted from the temporary DB 341, allowing the user to track the location of the stolen motorcycle 100.
<Flowchart 5>

Figure 14:
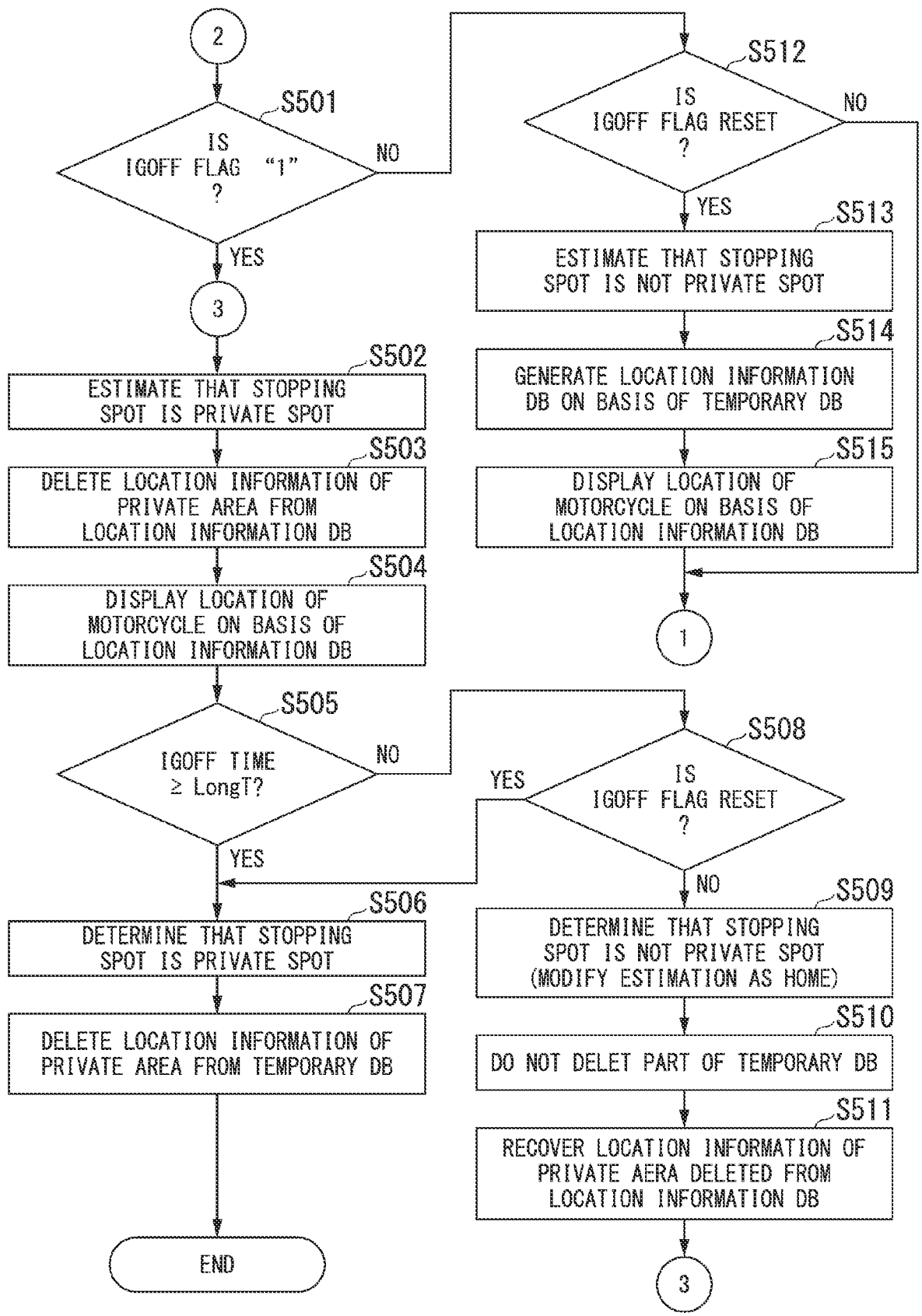
FIG. 14 is a flowchart showing an example of processing by the information management server 300 according to a fourth embodiment.

FIG. 14 is a flowchart showing an example of processing by the information management server 300 according to the fourth embodiment. While not shown, as described above, the information management server 300 determines whether it is the IGON timing (step S101). When it is the IGON timing, the information management server 300 receives the vehicle information from the motorcycle 100 (step S102), and saves it in the temporary DB 341 (step S103).

Next, the information management server 300 determines whether the IGOFF timer flag is "1" (step S501). When the IGOFF timer flag="1," the information management server 300 estimates that the stopping spot is the private spot (step S502), and modifies the location information DB 342 to delete or blur and display the location information included in the private area (step S503). Then, the information management server 300 outputs the information indicating the location of the motorcycle 100 from the output part 330 with reference to the location information DB 342 after modification (step S504).

Next, the information management server 300 determines whether the clocking time by the IGOFF timer is equal to or greater than the set time LongT (step S505). When the clocking time by the IGOFF timer is equal to or greater than the set time LongT, the information management server 300 determines that the stopping spot estimated as the private spot is the private spot (step S506), and modifies the temporary DB 341 to delete or blur and store the location information included in the private area (step S503).

Meanwhile, in step S505, when it is determined that the clocking time by the IGOFF timer is less than the set time LongT, the information management server 300 determines whether the IGOFF timer flag is reset (step S508). When the IGOFF timer flag is reset, the information management server 300 proceeds to step S506. That is, when the ignition switch 114 of the motorcycle 100 is turned on in a state in which the clocking time by the IGOFF timer is less than the set time LongT, since it is assumed that it takes time to turn off the ignition switch 114 by a thief, it is assumed that the owner of the motorcycle 100 turned on the ignition switch 114. For this reason, it is determined that a stopping spot that is estimated to be a private spot is likely to be a private spot.

Meanwhile, in step S508, when it is determined that the IGOFF timer flag is not reset, the information management server 300 determines that the stopping spot estimated as the private spot is not the private spot (step S509). That is, as described above, since it is assumed that the thief will take some time to turn off the ignition switch 114, the information management server 300 modifies the estimation result in step S502.

Then, the information management server 300 prevents the location information from being deleted from the temporary DB 341 (step S510) so that the location of the stolen motorcycle 100 can be traced. In addition, the information management server 300 may restore a part of the location information DB 342 that was deleted or modified to be blurred and displayed in step S503 (step S511). By doing so, all the location information of the motorcycle 100 that may have been stolen can be output from the output part 330.

Returning to step S501, if the IGOFF timer flag is not "1," the information management server 300 determines whether the IGOFF timer flag has been reset (step S512). When the IGOFF timer flag is reset, the information management server 300 estimates that the stopping spot is not the private spot (step S513). Then, the information management server 300 copies the location information of the period from ON to OFF of the ignition switch 114 on the basis of the temporary DB 341 and stores it in the location information DB 342 (step S514), and outputs the information indicating the location of the motorcycle 100 from the output part 330 with reference to the location information DB 342 (step S515).

Meanwhile, when the IGOFF timer flag is not reset in step S512, the information management server 300 returns to step S102 and repeats the processing.

According to the above-mentioned fourth embodiment, it is determined whether the stopping spot estimated to be the private spot may not be the private spot, and if there is a possibility that it is not the private spot, the location information is not deleted from the temporary DB 341. In this way, even if it is stolen, the location of the motorcycle 100 can be traced.

For example, if it is in the IGOFF state for more than 2 days, since there is a high possibility that the motorcycle is parked in the private spot such as the user's house, anonymity can be secured by deleting or blurring and displaying the location information of the motorcycle 100. However, since the two days is quite a long time, if the user turns on the IGON within 8 hours to 2 days due to work or the like, anonymity can be secured by estimating that the user turned on the ignition switch 114 of the motorcycle 100 at the private spot such as the house, and deleting or blurring and displaying the location information of the motorcycle 100.

Meanwhile, if the user finds out in the morning that the motorcycle 100 has been stolen in the middle of the night, it is assumed that the thief probably does not have the key and cannot IGON immediately. Here, if the IGOFF time is within 2 days, in consideration of the possibility that the motorcycle 100 has been stolen, the location information is not deleted from the temporary DB 341. That is, by adding a condition to determine whether it is longer than the set time LongT or not, it is possible to keep anonymity and prevent the temporary location information from being deleted unless two days have passed and it has not been IGON such that the location of the vehicle can be grasped immediately if the vehicle is stolen.

Fifth Embodiment

Hereinafter, a fifth embodiment will be described. In the first to fourth embodiments, an example in which the information management server 300 executes processing of determining whether the stopping spot of the motorcycle 100 is the user's private spot or not has been described. In the fifth embodiment, an example will be described in which a motorcycle 100A executes processing of determining whether the stopping spot of the motorcycle 100 is the user's private spot or not. Hereinafter, the description will focus on the differences from the first to fourth embodiments.

Figure 15:
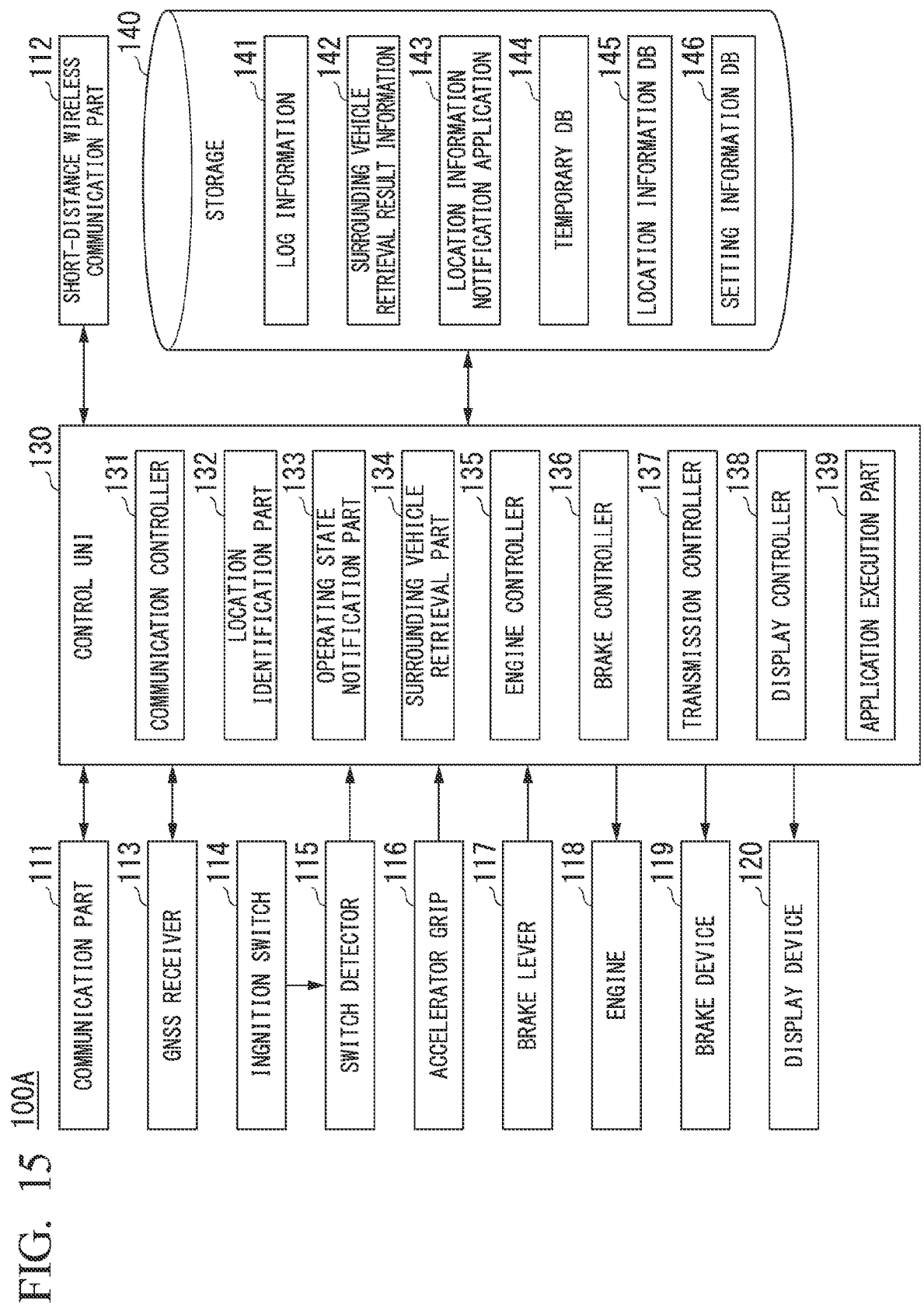
FIG. 15 is a functional block diagram of a motorcycle 100A of a fifth embodiment.

FIG. 15 is a functional block diagram of the motorcycle 100A of the fifth embodiment. Here, the points that are different from the motorcycle 100 of the first embodiment will be described. The motorcycle 100A further stores a location information notification application 143, a temporary DB 144, a location information DB 145, and a setting information DB 146 in the storage 140. These DBs are the same as the temporary DB 341, the location information DB 342, and the setting information DB 344 of the information management server 300. Further, the location information notification application 143 is a program of causing the motorcycle 100 to execute some processing of the information management server 300 (processing of determining whether the stopping spot of the motorcycle 100 is the user's private spot).

The controller 130 further includes an application execution part 139. The application execution part 139 is realized by executing the location information notification application (program) 143 stored in the storage 140 using a processor such as a CPU or the like. For example, the application execution part 139 executes processing of determining whether the stopping spot of the motorcycle 100 is the user's private spot, and transmits the determination result to the information management server 300. The information management server 300 modifies the location information DB 145 as described above on the basis of the received determination result, and outputs the modified location information from the output part 330.

Sixth Embodiment

Hereinafter, a sixth embodiment will be described. In the first to fourth embodiments, the example in which processing of determining whether the stopping spot of the motorcycle 100 is the user's private spot is executed by the information management server 300 has been described. In the sixth embodiment, an example in which processing of determining whether a stopping spot of the motorcycle 100 is a user's private spot is executed by a user terminal device 200A will be described. Hereinafter, description will focus on the differences from the first to fourth embodiment.

Figure 16:
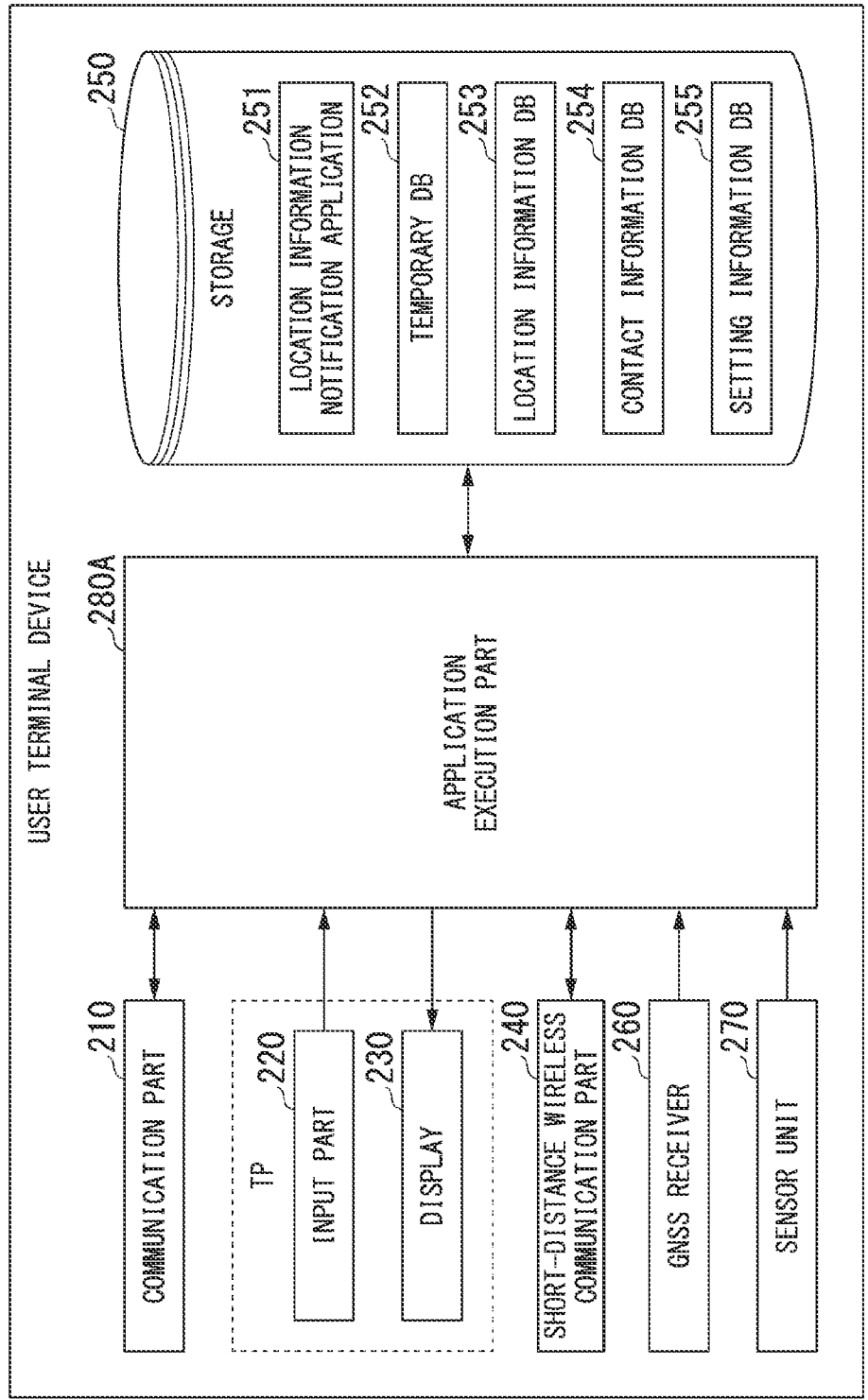
FIG. 16 is a functional block diagram of a user terminal device 200A of a sixth embodiment.

FIG. 16 is a functional block diagram of the user terminal device 200A of the sixth embodiment. Here, description will focus on the differences from the user terminal device 200 of the first embodiment. The user terminal device 200A further stores a temporary DB 252, a location information DB 253, a contact information DB 254, and a setting information DB 255 in the storage 250. These DBs are the same as the temporary DB 341, the location information DB 342, the contact information DB 343, and the setting information DB 344 of the information management server 300. In addition, the location information notification application 251 is a program of causing the motorcycle 100 to further execute some of processing of the information management server 300 (processing of determining whether the stopping spot of the motorcycle 100 is the user's private spot).

The application execution part 280A includes the same function as the processing part 350 of the information management server 300. For example, the application execution part 280 executes processing of determining whether the stopping spot of the motorcycle 100 is the user's private spot, and transmits the determination result to the information management server 300. The information management server 300 stores the stopping spot in the location information DB 253 on the basis of the received determination result as described above, and outputs the received location information from the output part 330.

The above-mentioned embodiment can be expressed as follows.

A location information output method performed by a computer including a storage device; and
  a hardware processor configured to execute a program stored in the storage device,
  the hardware processor executing the program to:
  acquire location information from a moving body via a network, the location information being information indicating a location measured by a location measuring device (113, 260) mounted on the moving body which includes at least one of a vehicle (100) and a terminal device (200) owned by an occupant of the vehicle;
  determine an operating state of the vehicle on the basis of the information received from the moving body via the network; and
  in a case a transition of the operating state of the vehicle satisfies a predetermined condition, output information indicating that the moving body is present at a location indicated by the location information from an output part (330) on the basis of the location information in which location information, which corresponds to a predetermined area including a spot at a time when the operating state of the vehicle has become OFF, is excluded.

Hereinabove, while the mode for performing the present invention has been described using the embodiment, the present invention is by no means limited to this embodiment, and various modifications and replacements may be made without departing from the scope of the present invention.

For example, some of the location information notification processing by the information management server 300 in the first to fourth embodiments may be executed in the moving body (the motorcycle 100 or the user terminal device 200) and cooperate with the moving body and the information management server 300 to execute the location information notification processing.

For example, the information management server 300 stores the location information indicating the estimated user's private spot in the storage 340, and from the next time, the spot stored in the storage 340 may be used as the private spot without executing estimation processing.

Further, the present invention is not limited to the above-mentioned embodiment, and for example, the system is not limited to motorcycles, but can be widely applied to saddle riding vehicles. The saddle riding vehicle includes all vehicles in which the driver straddles the vehicle body, including not only motorcycles (including motorized bicycles and scooter-type vehicles), but also vehicles with three wheels (including vehicles with one front wheel and two rear wheels, as well as vehicles with two front wheels and one rear wheel) or vehicles with four wheels. In addition, vehicles that include an electric motor as a prime mover are also included. In addition, it may be applied to the motor vehicle which has a passenger compartment. In addition, it may be applied to various devices that require communication other than vehicles. For example, it may be applied to devices such as storage boxes and bags with communication functions. In addition, this system is not limited to saddle riding vehicles, but may be applied to vehicles with four or more wheels, such as sedans, that can accommodate multiple people.

REFERENCE SIGNS LIST

1 Location information output system
100 Motorcycle
200 User terminal device
300 Information management server
310 Communication part
320 Input part
330 Output part
340 Storage
350 Processing part
351 Data management part
352 Output information generation part
353 Output controller
354 Engine operating state determination part
355 Timer management part
356 Stopping spot estimation part
357 Output information modification part
358 Stopping spot determination part
359 Temporary information modification part
360 Provision information generation part

What is claimed is:

1. A location information output method of causing a computer to:
acquire location information from a moving body via a network, the location information indicating a location measured by a location measuring device mounted on the moving body which includes at least one of a vehicle and a terminal device owned by an occupant of the vehicle;
determine an operating state of the vehicle on the basis of the information received from the moving body via the network; and
in a case a transition of the operating state of the vehicle satisfies a predetermined condition, output information indicating that the moving body is present at a location indicated by the location information from an output part on the basis of location information in which location information, which corresponds to a predetermined area including a spot at a time when the operating state of the vehicle has become OFF, is excluded,
in a case the operating state of the vehicle has become OFF, the computer measures an elapsed time from a time point when the operating state of the vehicle has become OFF,
in a case the elapsed time from the time point when the operating state of the vehicle has become OFF is equal to or greater than a first set time, the computer outputs information indicating that the moving body is present at a location indicated by the location information from the output part on the basis of the location information in which the location information, which corresponds to the predetermined area including the spot at the time when the operating state of the vehicle has become OFF, is excluded, and
in a case the elapsed time from the time point when the operating state of the vehicle has become OFF is equal to or greater than a second set time which is longer than the first set time, the computer deletes the location information, which corresponds to the predetermined area including the spot at the time when the operating state of the vehicle has become OFF, from a database in which the location information received from the moving body is stored.

2. The location information output method according to claim 1, wherein, in a case the elapsed time from the time point when the operating state of the vehicle has become OFF is less than the second set time and equal to or greater than the first set time and in a case the operating state of the vehicle is in a non-operating state, the computer does not delete the location information, which corresponds to the predetermined area including the spot at the time when the operating state of the vehicle has become OFF, from the database in which the location information received from the moving body is stored.

3. A location information output method of causing a computer to:
acquire location information from a moving body via a network, the location information indicating a location measured by a location measuring device mounted on the moving body which includes at least one of a vehicle and a terminal device owned by an occupant of the vehicle;
determine an operating state of the vehicle on the basis of the information received from the moving body via the network;
communicate with other vehicles present in a predetermined surrounding area of the vehicle;
calculate a number of other vehicle present in the predetermined surrounding area of the vehicle;
in a case the elapsed time from the time point when the operating state of the vehicle has become OFF is equal to or greater than a set time and in a case the number of the other vehicles present in the predetermined surrounding area is less than a threshold, the computer output information indicating that the moving body is present at a location indicated by the location information from the output part on the basis of the location information in which the location information, which corresponds to the predetermined area including a spot at the time when the operating state of the vehicle has become OFF, is excluded; and
in a case the elapsed time from the time point when the operating state of the vehicle has become OFF is equal to or greater than a set time and in a case the number of the other vehicles present in the predetermined surrounding area is equal to or greater than a threshold, the computer output information indicating that the moving body is present at a location indicated by the location information from the output part on the basis of the location information in which the location information, which corresponds to the predetermined area including the spot at the time when the operating state of the vehicle has become OFF, is included.

4. The location information output method according to claim 3, wherein the computer acquires a time period in which the operating state of the vehicle is in an OFF state, and
changes the set time according to the acquired time period in which the operating state of the vehicle is in the OFF state.

5. The location information output method according to claim 4, wherein, in a case the time period in which the operating state of the vehicle is in the OFF state is a predetermined late night time period, the computer sets the set time to a first duration shorter than a reference value, and
in a case the time period in which the operating state of the vehicle is in the OFF state is a predetermined daytime period, the computer sets the set time to a second duration longer than the reference value.

6. A location information output system comprising a moving body including at least one of a vehicle and a terminal device owned by an occupant of the vehicle, and an information management server configured to communicate with the moving body via a network,
wherein the moving body includes a communication part configured to transmit location information, which is information indicating a location of the moving body and which indicates a location measured by a location measuring device mounted on the moving body to the information management server via the network, and
the information management server includes:
an operating state determination part configured to determine an operating state of the vehicle on the basis of the information received from the moving body via the network;
a management part configured to measure an elapsed time from a time point when the operating state of the vehicle has become OFF in a case the operating state of the vehicle becomes OFF; and
an output controller configured to output information indicating that the moving body is present at a location indicated by the location information from an output part on the basis of the location information in which location information, which corresponds to a predetermined area including a spot at a time when the operating state of the vehicle has become OFF, is excluded in a case a transition of the operating state of the vehicle satisfies a predetermined condition, and
in a case the elapsed time from the time point when the operating state of the vehicle has become OFF is equal to or greater than a first set time, the output controller outputs information indicating that the moving body is present at a location indicated by the location information from the output part on the basis of the location information in which the location information, which corresponds to the predetermined area including the spot at the time when the operating state of the vehicle has become OFF, is excluded, and
in a case the elapsed time from the time point when the operating state of the vehicle has become OFF is equal to or greater than a second set time which is longer than the first set time, the information management server deletes the location information, which corresponds to the predetermined area including the spot at the time when the operating state of the vehicle has become OFF, from a database in which the location information received from the moving body is stored.

7. A location information output system comprising a moving body including at least one of a vehicle and a terminal device owned by an occupant of the vehicle, and an information management server configured to communicate with the moving body via a network,
wherein the moving body includes a communication part configured to transmit location information, which is information indicating a location of the moving body and which indicates a location measured by a location measuring device mounted on the moving body, to the information management server via the network, and
the information management server includes:
a communication part configured to communicate with other vehicles present in a predetermined surrounding area of the vehicle;
an operating state determination part configured to determine an operating state of the vehicle on the basis of the information received from the moving body via the network; and
an output controller configured to output information indicating that the moving body is present at a location indicated by the location information from an output part on the basis of the location information in which location information, which corresponds to a predetermined area including a spot at a time when the operating state of the vehicle has become OFF, is excluded in a case a transition of the operating state of the vehicle satisfies a predetermined condition,
the information management server calculates a number of the other vehicles present in the predetermined surrounding area, and
in a case the elapsed time from the time point when the operating state of the vehicle has become OFF is equal to or greater than a set time and in a case the number of the other vehicles present in the predetermined surrounding area is less than a threshold, the output controller outputs information indicating that the moving body is present at a location indicated by the location information from the output part on the basis of the location information in which the location information, which corresponds to the predetermined area including the spot at the time when the operating state of the vehicle has become OFF, is excluded, and
in a case the elapsed time from the time point when the operating state of the vehicle has become OFF is equal to or greater than a set time and in a case the number of the other vehicles present in the predetermined surrounding area is equal to or greater than a threshold, the information management server outputs information indicating that the moving body is present at a location indicated by the location information from the output part on the basis of the location information in which the location information, which corresponds to the predetermined area including the spot at the time when the operating state of the vehicle has become OFF, is included.

8. A computer readable non-transitory storage medium that stores a program configured to cause a computer to:
acquire location information from a moving body via a network, the location information being information indicating a location measured by a location measuring device mounted on the moving body which includes at least one of a vehicle and a terminal device owned by an occupant of the vehicle, determine an operating state of the vehicle on the basis of the information received from the moving body via the network, and in a case a transition of the operating state of the vehicle satisfies a predetermined condition, output information indicating that the moving body is present at a location indicated by the location information from an output part on the basis of the location information in which location information, which corresponds to a predetermined area including a spot at a time when the operating state of the vehicle has become OFF, is excluded, wherein the computer measures an elapsed time from a time point when the operating state of the vehicle has become OFF in a case in which the operating state of the vehicle becomes OFF, in a case the elapsed time from the time point when the operating state of the vehicle has become OFF is equal to or greater than a first set time, the computer outputs information indicating that the moving body is present at a location indicated by the location information from the output part on the basis of the location information in which the location information, which corresponds to the predetermined area including the spot at the time when the operating state of the vehicle has become OFF, is excluded, and in a case the elapsed time from the time point when the operating state of the vehicle has become OFF is equal to or greater than a second set time which is longer than the first set time, the computer deletes the location information, which corresponds to the predetermined area including the spot at the time when the operating state of the vehicle has become OFF, from a database in which the location information received from the moving body is stored.

9. A computer readable non-transitory storage medium that stores a program configured to cause a computer to:

acquire location information from a moving body via a network, the location information being information indicating a location measured by a location measuring device mounted on the moving body which includes at least one of a vehicle and a terminal device owned by an occupant of the vehicle, determine an operating state of the vehicle on the basis of the information received from the moving body via the network, communicate with other vehicles present in a predetermined surrounding area of the vehicle, calculate a number of the other vehicles present in the predetermined surrounding area, in a case the elapsed time from the time point when the operating state of the vehicle has become OFF is equal to or greater than a set time and in a case the number of the other vehicles present in the predetermined surrounding area is less than a threshold, output information indicating that the moving body is present at a location indicated by the location information from the output part on the basis of the location information in which the location information, which corresponds to the predetermined area including a spot at the time when the operating state of the vehicle has become OFF, is excluded, and in a case the elapsed time from the time point when the operating state of the vehicle has become OFF is equal to or greater than a set time and in a case the number of the other vehicles present in the predetermined surrounding area is equal to or greater than a threshold, output information indicating that the moving body is present at a location indicated by the location information from the output part on the basis of the location information in which the location information, which corresponds to the predetermined area including the spot at the time when the operating state of the vehicle has become OFF, is included.

* * * * *